(12) United States Patent
Asoh

(10) Patent No.: US 6,415,350 B2
(45) Date of Patent: Jul. 2, 2002

(54) CARD-TYPE STORAGE MEDIUM

(75) Inventor: Izumi Asoh, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 09/037,007

(22) Filed: Mar. 9, 1998

(30) Foreign Application Priority Data

Jun. 17, 1997 (JP) .............................................. 9-160164

(51) Int. Cl.[7] .............................................. G06F 12/00
(52) U.S. Cl. ...................................................... 711/103
(58) Field of Search ................................. 711/170, 172, 711/173, 1, 2, 5, 115, 201, 156, 161, 162, 103; 710/8, 10, 13, 17, 101, 102, 103, 104

(56) References Cited

U.S. PATENT DOCUMENTS

| | | | |
|---|---|---|---|
| 4,564,922 A | * 1/1986 | Muller | 711/161 |
| 4,983,816 A | * 1/1991 | Iijima | 235/379 |
| 5,175,842 A | * 12/1992 | Totani | 711/161 |
| 5,193,171 A | * 3/1993 | Shinmura et al. | 364/245.3 |
| 5,530,938 A | * 6/1996 | Akasaka et al. | 711/103 |
| 5,682,549 A | * 10/1997 | Tanaka et al. | 710/8 |
| 5,742,792 A | * 4/1998 | Yanai et al. | 711/162 |
| 5,937,434 A | * 8/1999 | Hasbun et al. | 711/170 |
| 6,134,628 A | * 10/2000 | Hamadani | 711/103 |
| 6,202,138 B1 | * 3/2001 | Estakhri et al. | 711/168 |

FOREIGN PATENT DOCUMENTS

JP 7-239928 9/1995

OTHER PUBLICATIONS

Microsoft Press Computer Dictionary, 1997, p 51.*

* cited by examiner

*Primary Examiner*—Matthew Kim
*Assistant Examiner*—C. P. Chace
(74) *Attorney, Agent, or Firm*—Armstrong, Westerman & Hattori, LLP

(57) ABSTRACT

A non-volatile memory installed inside an IC card having a main area and a temporary storage area. The main area is the area in which data is referred to by a host computer. The temporary storage area is the area in which data is transmitted and written by the host computer. Data from the host computer is copied to the main area after being written once in the temporary storage area. Further, data inside the temporary storage area which has not been yet copied is then copied to the main area at the time of power-up. Therefore, even if a power interruption occurs while data is input from the host computer to the IC card, data inside the main area is never destroyed and data inside the main area can be restored based on data remaining in the temporary storage area.

17 Claims, 19 Drawing Sheets

REGISTER COMPOSITION OF
A NON-VOLATILE MEMORY
CONTROL CIRCUIT

CONTROL REGISTER/STATUS REGISTER

| STARTING POSITION OF THE FILE |
| STARTING POSITION OF A MIRROR FILE |
| OVERALL SIZE OF THE FILE |
| ATTRIBUTE OF THE FILE |
| LENGTH OF RECORD |
| BLOCKING FACTOR |
| FINISHING RECORD NUMBER |

SUBSTITUTIONAL SECTOR ADDRESS | SUBSTITUTIONAL SECTOR AREA
101
102
103 — 27h
104
105
106

SUBSTITUTIONAL SECTOR MANAGING AREA

| BAD SECTOR ADDRESS | SUBSTITUTIONAL SECTOR ADDRESS |
|---|---|
| 11 | 101 |
|  |  |
|  |  |
|  |  |
|  |  |

— IN USE/UNUSED/ABNORMAL SECTOR

|  | STATUS | NEXT | PREVIOUS | NUMBER OF TIMES | DATA |
|---|---|---|---|---|---|
| n-1 | IN USE | n | n-2 | x | AAA |
| n | IN USE | n+1 | n-1 | y | BBBB |
| n+1 | IN USE | n+2 | n | z | CCCCC |
| n+2 | IN USE | n+3 | n+1 | w | DDDDDD |

FIG.23

|   | STATUS | NEXT | PREVIOUS | NUMBER OF TIMES | DATA |
|---|---|---|---|---|---|
| m | UNUSED | | | | |
| m+1 | UNUSED | | | | |
| m+2 | UNUSED | | | | |
| m+3 | UNUSED | | | | |

CARD-TYPE STORAGE MEDIUM

BACKGROUND OF THE INVENTION

1. Field of the Invention

The present invention relates to a card-type storage medium comprising a memory built in a card-type casing, such as an IC card, and particularly, to a card-type storage medium in which destruction of files can be prevented even if an accident, such as a power interruption, occurs while data is written in the file.

2. Description of the Related Art

In recent years, IC cards have been used as media of electronic money, credit cards, ID cards, self-governing body cards and so on. In order to facilitate practical use of such IC cards, it is indispensable to establish technologies for protecting files in case power failures, errors, etc, occur while data is written in the files, as well as security technologies for preventing rewriting of files by unauthorized persons. For this purpose, various technologies have been conventionally proposed for the protection of files. These technologies are roughly divided into two types, as described below.

A first conventional technology is that a higher-class unit accessing an IC card (writing data in the file) recovery files inside the IC card. In this case, the higher-class unit keeps retaining a file to be overwritten on the IC card until the overwriting on the ID card of the file is completed, and, in case power failures or errors occur while the file is overwritten, recovers a file inside the IC card based on the file retained.

A second conventional technology is the one disclosed in Japanese Patent Application Laid-open No. Hei. 7-239928, in which a processor inside an IC card recovers a file based on recovery information prepared in advance. In this case, once a file is written inside the IC card (or overwritten), the processor inside the IC card generates recovery information consisting of data with identical composition as the file and stores the information inside the IC card. Then, when power failures or errors occur during renewal of the file, the processor copies the recovery information and overwrites it in the storage position of the original file.

However, the above mentioned conventional technologies, while accepting that an objective file is destroyed in case power failures or errors occur while data is written in the file, are used for the purpose of restoring the file after the destruction of the file. Therefore, various problems, as mentioned hereinafter, arise. This means that, according to the above-mentioned first conventional technology, since a normal file cannot exist inside an IC card until a file is recovered by a higher-class unit, the IC card becomes absolutely unavailable until the recovery. In addition, according to the above-mentioned second conventional technology, although data is recovered autonomically at the time when an IC card is supplied power again, since the recovery information must include data of the entire original file, the data volume to be retained by the IC card becomes enormous. For this reason, such problems as the delay of a response has become significant because of the increase of time required for a file search or the increase of time for preparing recovery information.

Further, in case a memory of an IC card is a flash memory, writing of data in a file retained by a certain storage area may be impossible due to the expired life of an element in the storage area. In such a case, backups have been conventionally executed in ways such that an application program of a higher-class unit rearranges the entire file by removing the storage area impossible to be written in or transfers the entire file to another IC card while the original IC card is treated as an invalid medium. For this reason, autonomical restoring by an IC card itself has been impossible, which has resulted in the increase of load for the higher-class unit.

SUMMARY OF THE INVENTION

The present invention has been made in view of the above described circumstances, and therefore, a first object of the present invention is to provide a card-type storage medium which can prevent the destruction itself of a file in case power failures, errors, etc, occur while data is written in the file inside the storage medium; prevent the increase of data volume retained by the storage medium and improve a response to a higher-class unit.

A second object of the present invention is to provide a card-type storage medium in which autonomic rearrangement of a file becomes possible inside the storage medium even in case writing of data in a certain storage area becomes impossible due to the expired life of an element, etc.

According to a first aspect of the present invention, a card-type storage medium is provided for attaining the above mentioned first object. The card-type storage medium is detachably connected to a higher-class unit writing data into the media. The card-type storage medium is comprised of a first non-volatile storage area storing data, a second non-volatile storage area temporarily storing data input by the higher-class unit, and a writing element which writes the data stored in the second non-volatile storage area into the first non-volatile storage area when the storing of data into the second non-volatile storage area by the higher-class unit is completed.

According to the first aspect of the present invention, in a card-type storage medium composed as mentioned above, a second non-volatile storage area in which data input by the higher-class unit is stored temporarily is prepared as well as a first non-volatile storage area for storing data to be read by the higher-class unit. The writing element writes data stored in the second non-volatile storage area into the first non-volatile storage area after the data input by the higher-class unit is completely stored in the second non-volatile storage area. Therefore, even if a power interruption occurs while data is input to a card-type non-volatile storage medium by the higher-class unit, since data inside the second non-volatile storage area is merely destroyed and data actually stored in the first non-volatile storage area is never destroyed, the higher-class unit can refer to data stored in the first non-volatile storage area and the card can be continuously used as it is. Further, once data is completely stored normally in the second non-volatile storage area, even if a power interruption occurs the writing element can write the data stored inside the second non-volatile storage area into the first non-volatile storage area without requiring recovery processing by the higher-class unit. In addition, since the second non-volatile storage area need not retain all the data stored inside the first non-volatile memory area and may only store the data input by the higher-class unit, the data volume to be retained within the entire card-type non-volatile storage medium never becomes excessive. Moreover, once the higher-class unit inputs data into the second non-volatile storage area, the higher-class unit can take a next action immediately because it is exempted from the duty of recovering, etc, thereafter. This means that a response to the higher-class unit is improved.

A card-type storage medium may take, for example, the form of a PC card according to PCMCIA. A higher-class unit to which the card-type storage medium is connected detachably may be a computer which can write data into and read data from the card-type storage medium. As an example of such a computer, a computer used for a electronic money system is given. In addition, a higher-class unit may be a computer which can write data only in a card-type storage medium and a computer which can read data only from a card-type storage medium. Examples of such computers are computers for a credit card system and a self-governing body card system.

A first non-volatile storage area and a second non-volatile storage area may be established either on the same semiconductor device or on independent semiconductor devices. An element may be, for example, a flash memory or an $E^2$ ROM.

According to a second aspect of the present invention, in the above-described card-type storage medium, the above mentioned writing element writes the data stored in the second non-volatile storage area into the first non-volatile storage area when the writing element is powered-up. When composed like this, even if the supply of power to the card-type storage medium is interrupted while the writing element writes data stored in the second non-volatile storage area into the first non-volatile storage area, since data left in the second non-volatile storage area is written into the second non-volatile storage area automatically by the writing element upon the power supplied again, re-operation of the card-type storage medium becomes possible without making a user aware that the data inside the first non-volatile storage area has been destroyed by the power interruption. Further, it is not necessary to again supply power to the card-type storage medium by a higher-class unit connected to the card-type storage medium at the time of a power interruption, but the writing element can write data even if power is supplied by any other apparatuses.

According to a third aspect of the present invention, the card-type storage medium is further comprised of a data storing completion notifying element, which, upon finishing storing the data input by a higher-class unit into the second non-volatile storage area, notifies the higher-class unit of the completion of data storing, and the above-mentioned writing element writes the data stored in the second non-volatile storage area in the first non-volatile storage area after the completion of data storing is notified to the higher-class unit by the data storing completion notifying element. When composed like this, the higher-class unit can be made aware that the recovery to the card-type storage medium is no longer necessary.

According to a fourth aspect of the present invention, in the card-type storage medium, the first non-volatile storage area and the second non-volatile storage area are established on the same non-volatile memory.

According to a fifth aspect of the present invention, in the above-described card-type storage medium, the first non-volatile storage area and the second non-volatile storage area are divided into multiple sectors, respectively, and the above-mentioned writing element writes the data stored in each of the sectors in the second non-volatile storage area into any of the sectors in the first non-volatile storage area.

According to a sixth aspect of the present invention, the card-type storage medium is further comprised of an identifying element which identifies, for each sector of the second non-volatile storage area, whether or not writing of data stored in the sector into the first non-volatile storage area has been completed, and the above-mentioned writing element writes the data stored therein into any sector of the first non-volatile storage area, only for a sector of the second non-volatile storage area for which the identifying element identifies that writing of the data stored therein into the first non-volatile storage area has not been completed. When composed like this, since the writing element may not write again the data which has already been completed to be written to the second non-volatile storage area, processing times are shortened.

According to a seventh aspect of the present invention, in the card-type storage medium, data stored in the abovementioned first non-volatile storage area is composed of a plurality of files and is doubled only for a portion of the files. When composed like this, since only important files are doubled, the risk of losing data can be prevented.

According to an eighth aspect of the present invention, a card-type storage medium is composed in order to attain the second object as well as above-mentioned first object, and the card-type storage medium is further comprised of a determining element which determines whether or not writing of data into a certain sector is possible and a substitutional sector layout element which specifies any of the unused sectors in the first non-volatile storage area as a substitutional sector and makes the writing element write the data in substitutional sector when writing of data into the sector is determined to be impossible by the determining element. When composed like this, the substitutional sector layout element can lay out an unused sector as a substitutional sector into which the determining element has determined data writing is impossible. Therefore, even if a portion of sectors in the first non-volatile storage area become unavailable due to expired life, etc., autonomical rearrangement of a file inside the card-type storage medium is possible without requiring rearrangement of the file by a higher-class unit.

According to a ninth aspect of the present invention, the card-type storage medium is further comprised of an unused sector managing element which manages unused sectors inside the first non-volatile storage area, and the substitutional sector layout element which specifies one of the unused sectors managed by the unused sector managing element as the substitutional sector.

According to a tenth aspect of the present invention, in the card-type storage medium, a sector existing in a specific position of the above-mentioned first non-volatile storage area is secured for a substitutional sector in advance and the substitutional sector layout element specifies one of the sectors secured for the substitutional sector as the substitutional sector.

According to an eleventh aspect of the present invention, in the card-type storage medium, the above-mentioned substitutional sector layout element has a correspondence table showing the corresponding relations of the substitutional sector to the unavailable sector as to which writing of the data has been determined to be impossible by the determining element. When composed like this, a program accessing the first non-volatile storage area can be aware of the substitutional sector laid out to the sector which has become unavailable by referring to the correspondence table.

According to a twelfth aspect of the present invention, in the card-type storage medium, the above-mentioned unused sector managing element has a status displaying area prepared for each sector inside the first non-volatile storage area for indicating whether the corresponding sector is in use, not in use, or unavailable.

According to a thirteenth aspect of the present invention, the card-type storage medium is comprised of, for each sector inside the first non-volatile storage area, a first pointer displaying area showing a pointer of a sector right before the object sector and a second pointer displaying area showing a pointer of a sector right after the object sector, and the substitutional sector layout element, when specifying a substitutional sector for an unavailable sector, changes indication of the status displaying area for the unavailable sector to indicate being unavailable, displays a pointer of the substitutional sector in the second pointer displaying area of the sector whose pointer is shown by the first pointer displaying area of the unavailable sector, and displays a point of the substitutional sector in the first pointer displaying area of the sector whose pointer is shown by the second pointer displaying area of the unavailable sector.

According to a fourteenth aspect of the present invention, the card-type storage medium is comprised of, for each sector inside the first non-volatile storage area, an area for displaying total number of times of data writing in the sector, and the determining element which determines a sector of which total number of times of data writing displayed in the rear for displaying the number of times of writing is equal to the predetermined number of times or more as a unavailable sector.

According to a fifteenth aspect of the present invention, in the card-type storage medium, the above-mentioned writing element carries out, prior to data writing processing to a certain sector, deletion processing to the sector, and when the time required until the completion of data deletion to a certain sector reaches the predetermined time, the above-mentioned determining element determines that the sector is unavailable.

According to a sixteenth aspect of the present invention, in the card-type storage medium, the above-mentioned writing element carries out, prior to data writing processing to a certain sector, deletion processing to the sector, and when the number of times if data deletion processing by the writing element required until the completion of data deletion in a certain sector is equal to a predetermined number of times or more, the determining element determines that the sector is unavailable.

According to a seventeenth aspect of the present invention, in the card-type storage medium, when the number of times of data writing processing by the writing element required until the completion of data writing in a certain sector is equal to or greater than the predetermined number of times the above-mentioned determining element judges that the sector is unavailable.

BRIEF DESCRIPTION OF THE DRAWINGS

The invention will be described below in detail with reference to the accompanying drawings, in which:

FIG. 23 is a table showing examples of information written in unused sectors.

DESCRIPTION OF THE PREFERRED EMBODIMENT

A preferred exemplary embodiment of the present invention will now be described with reference to the accompanying drawings.

Figure 1:
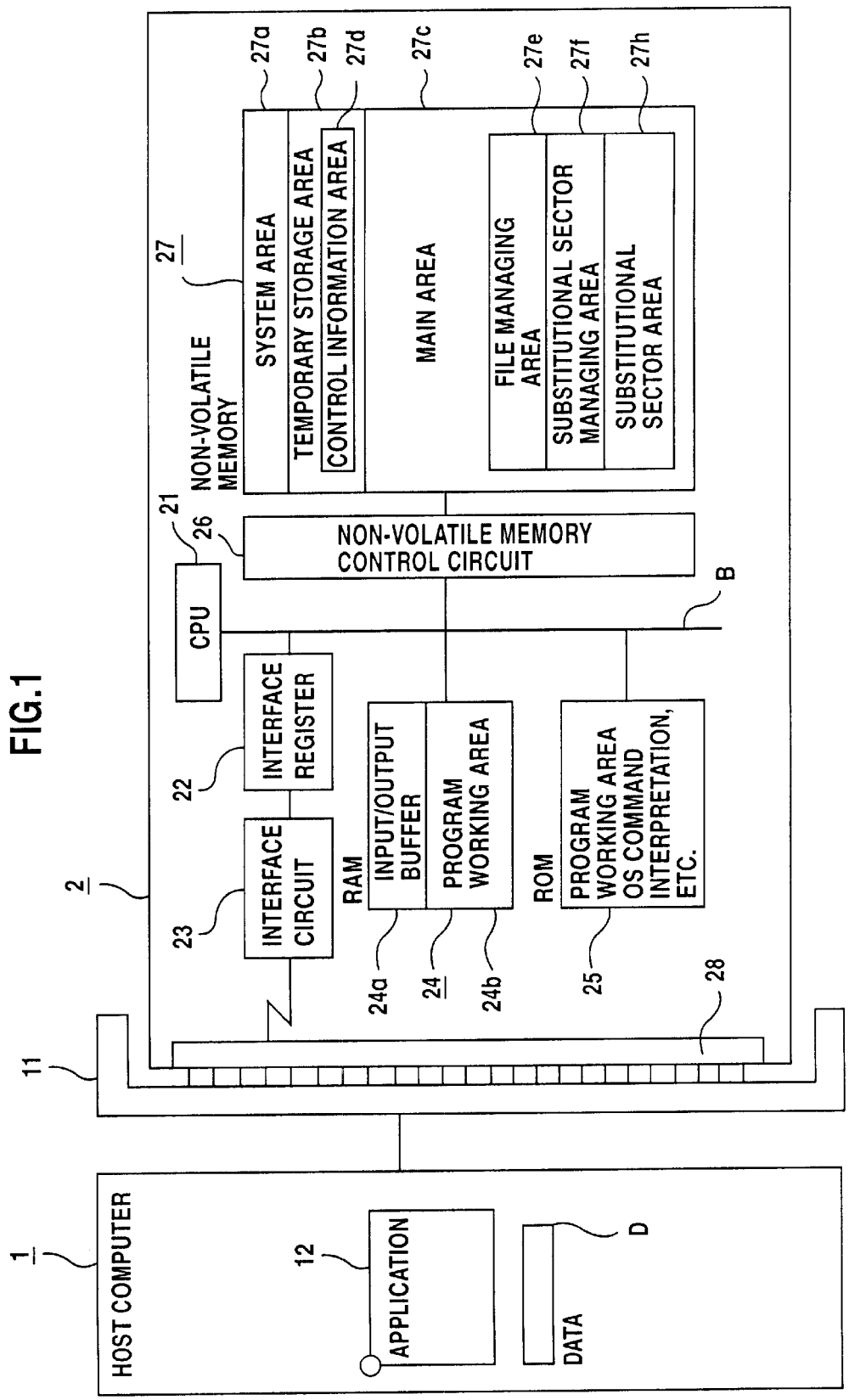
FIG. 1 is block diagram showing the outlined composition of a data managing system according to a first embodiment of the present invention.

FIG. 1 is a block diagram showing the outlined composition of a data managing system according to the first embodiment of the present invention. A card-type storage medium according to the first embodiment takes the form of IC card of a credit card type according to the ISO7816 standard. The card-type storage medium shall be hereinafter referred to simply as "IC card 2".

A host computer 1 (higher-class unit) in FIG. 1 is, for example, an adjustment apparatus or a price writing apparatus in an electronic money system; a reference and billing apparatus in a credit card system; a resident ledger managing apparatus in a self governing body card system; and so on. An interface device 11 is connected to the host computer 1 as a drive apparatus for an IC card 2. The interface device 11 is an apparatus for exchanging data by detachably connecting a bus leading to a CPU (not shown) in the host computer 1 and an internal circuit of the IC card 2. Specifically, the interface device 11 transmits to the IC card 2 various types of commands (deletion command, writing command, etc.) issued by an application program 12 executed in the CPU (not shown) in the host computer 1 and objective data of writing (hereinafter referred to as "data D"), and receives from the IC card 2 responses to these commands to notify the application program 12.

The internal circuit of the IC card 2 comprises a CPU 21, an interface register 22, RAM 24, ROM 25 and a non-volatile memory control circuit 26 mutually connected by a bus B, an interface circuit 23 connected to the interface register 22, a connector 28 connected to the interface circuit 23 and a non-volatile memory 27 connected to the non-volatile memory control circuit 26.

The connector 28 is a parallel connector connected to the interface device 11 in the host computer 1 side via multiple pins.

The interface circuit 23 manages data delivery and receipt by converting parallel data (various types of commands, data D) received via the connector 28 to a format which can be processed in the CPU 21 and by converting responses received from the CPU 21 to a format which can be transmitted to the interface device 11. The interface register 22 latches the data (various types of commands, data D) which the interface circuit 23 has received from the interface device 11 and allows the CPU 21 to read them.

The CPU 21, acting as a writing element, a data storing completing element, a determining element and a substitutional sector layout element controls each part in the internal circuit of the IC card 2 by carrying out various kinds of programs (an operation system and each application program executed on the operation system) stored in the ROM 25. This means that, in brief, the CPU 21 transfers the data (various types of commands, data D) latched by the interface register 22 to an input/output buffer 24a of the RAM 24 and interprets a command written in the input/output buffer 24a to conduct processing according to the command. For example, when there is a command for writing data D, the CPU 21 controls the non-volatile memory control circuit 26 and writes data D written in the input/output buffer 24a in the non-volatile memory 27.

The RAM 24 is a random access memory in which a program working area 24b, as well as the above-mentioned area of the input/output buffer 24a, are developed.

The non-volatile memory control circuit 26 forming a part of the writing element conducts an access to the non-volatile memory 27 in response to an instruction from the CPU 21. The non-volatile memory control circuit 26 reads out data stored in a position instructed by the CPU 21 (a position shown by a sector address and a relative address), deletes data stored in a position instructed by the CPU 21 and writes data notified by the CPU 21 in a position instructed by the CPU 21. The non-volatile memory control circuit 26 has a built-in register in which a instruction from the CPU 21 is written, and conducts an access (reading out, deletion, writing) to the above-mentioned non-volatile memory 27 by detecting the instruction written in the register and renews every pieces of information set inside the non-volatile memory 27.

Figure 2:
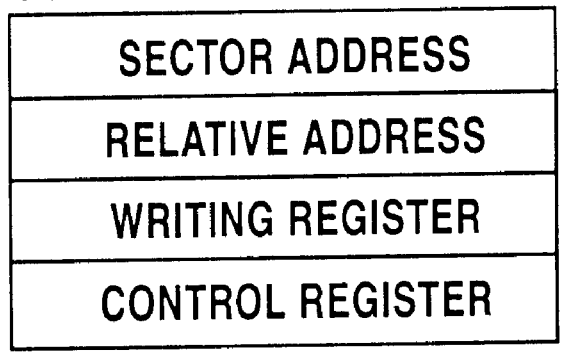
FIG. 2 is a drawing showing the register composition of a non-volatile memory control circuit of FIG. 1.
Figure 3:
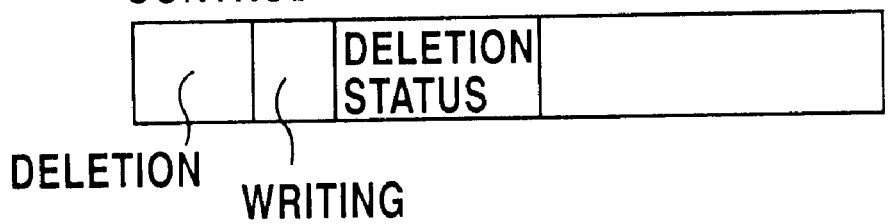
FIG. 3 is a drawing showing the detailed composition of the control register of FIG. 2.

FIG. 2 is a drawings showing the internal composition of the register. As shown in FIG. 2, the register inside the non-volatile memory control circuit 26 comprised a sector address register, a relative address register, a writing register and a control register. A head address of an access objective sector in the non-volatile memory 27 is set in the sector address register. Further, the relative address from the head address of the access objective sector to an access objective position is set in the relative address register. In addition, the data to be written in the access objective position in the access objective sector is set in the writing register. The control register has the structure shown in FIG. 3 and has bits for each type of access (deletion, writing) which are set when an instruction to access is rendered to the non-volatile memory control circuit 26 and are reset when an access corresponding to the instruction is completed, and has a status register for showing a state where the data deletion in an access objective sector is completed.

Referring to FIG. 1 again, the non-volatile memory 27 comprises flash memories and its storage area is divided into multiple sectors having the same size. Some of the sectors are used as a system area 27a, others of the sectors are used as a temporary storage area 27b, and all the remaining sectors are used as a main area 27c.

A system file (not shown) is stored in the system area 27a.

Data D (new data D or data D overwritten on old data by renewal) transmitted from the host computer 1 is written once in the temporary storage area 27b as the second non-volatile storage area. Now, each sector of the temporary storage area 27b is made to correspond to one of control information areas 27d, respectively. Each control information area 27d comprised "a writing status", "a writing objective sector address", "a relative position from the head of a sector" and "a writing size". "A writing status" as an identifying element shows the status of data in the corresponding sector. Specifically, the "writing status" of the control information area 27d shows that data is in the process of written in the corresponding sector (in data storing), that data exists in the corresponding sector (buffer full) or that reading out of data from the corresponding sector to the main area 27c is completed (buffer empty). In addition, "a writing objective sector address" shows (the head address of) a writing objective sector of data written (to be written) in the corresponding sector inside the main area 27c. Moreover, "a relative position from the head of a sector" shows a relative address of data D written (to be written) in the corresponding sector from the head address in the writing objective sector address. Furthermore, "a writing size" shows the size of data written in the corresponding sector.

Figure 4:
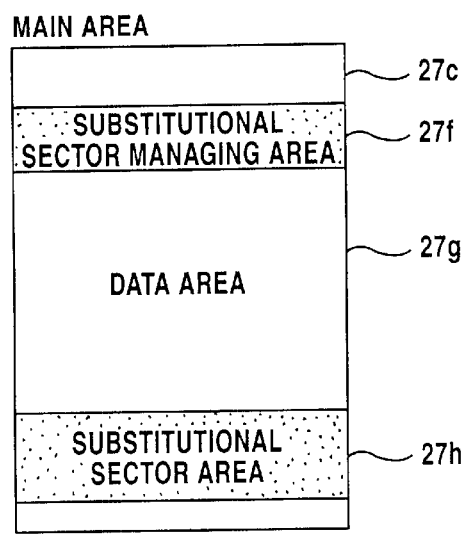
FIG. 4 is a memory map showing the structure of the main area inside the non-volatile memory of FIG. 1.

The main area 27c as the first non-volatile storage area is stored with a file to be read out and utilized by the host computer 1 and is renewed by data D written in the temporary storage area 27b. The main area 27c comprises a substitutional sector managing area 27f, a data area 27g and a substitutional sector area 27h as shown in FIG. 4.

A file is stored in the data area 27g. Inside the data area 27g, a file is stored across a plurality of sectors if it is larger than respective sectors. Further, since data D stored in the temporary storage are 27b comprises only a part of data to be rewritten in the file, it has the size of approximately 100 B (byte) compared to the size of approximately 10 KB (kilo byte) of the file.

Figure 5:
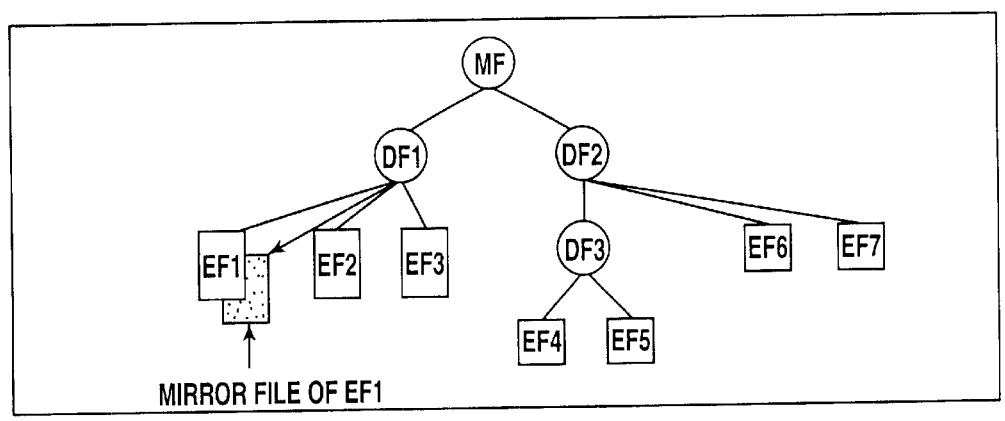
FIG. 5 is a drawing showing the tree structure of a file inside the main area of FIG. 4.

Further, each file inside the data are 27g is logically stored with a tree-type directory structure. shown in FIG. 5. In FIG. 5, MF is a node file defining a root directory, DF1 and DF2 are node files. defining a sub-directory subordinate to the root directory MF, DF3 is a node file defining a sub-directory subordinate to the sub-directory DF2, EF1 to EF3 are data files subordinate to the sub-directory DF1, EF4 and EF5 are data files subordinate to the sub-directory DF3, and EF6 and EF7 are data files subordinate to the sub-directory DF2. In addition, "a mirror file of EF1" in FIG. 5 is a backup file in which contents of the data file EF1 are copied in full coincidence.

Figures 6, 7:
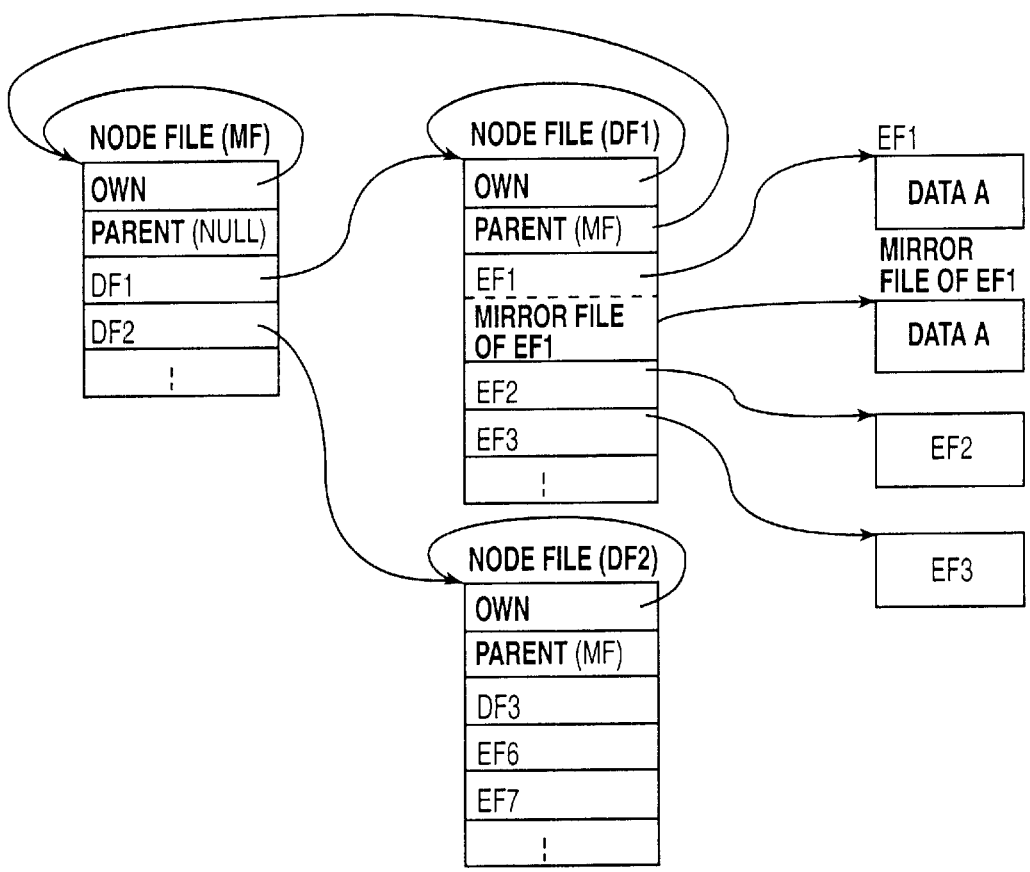
FIG. 6 is a drawing showing the structure of each node file of FIG. 5.
FIG. 7 is a explanatory drawing showing the detailed contents of each record in each node file of FIG. 6.

Structure of each node file is shown in FIG. 6. As shown in FIG. 6, each node file comprises a record in which own information is written, a record in which information of a file on a parent node (a node file) is written, a record in which information of a file on a child node (a node file or a data file subordinate to own node). As shown in FIG. 7, each record comprises a starting position (address) of an objective file, a starting position (address) of a mirror file corresponding to the object file, overall size (the number of sectors) of the objective file, and attribute of the objective file (distinction on whether the file is a node file or a data file), record length of the objective file, the number of records (blocking factor) inside one sector of the objective file and the finishing record number of the objective file. However, concerning a data file in which a mirror file is not prepared, a NULL value is set in the starting position of a mirror file. Further, since the entire record is treated as invalid if a NULL value is set in "the starting position of a file" of each record, a NULL value is set in a record in which information of a file on a parent node is to be written in the node file on the root directory MF.

Figures 8, 9:
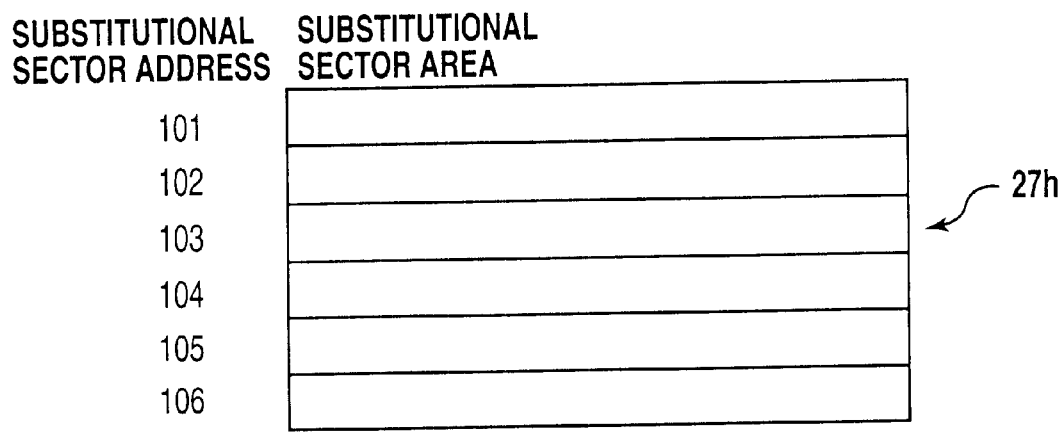
FIG. 8 is a memory map showing the structure of the substitutional sector area of FIG. 4.
FIG. 9 is a memory map showing the structure of the substitutional sector managing area of FIG. 4.

As shown in FIG. 8, the substitutional sector area 27h is the area which secures in advance an unused sector for a substitutional sector to be used, in case respective sectors composing the data area 27g become unavailable in place of the sector. Further, the sector address of each substitutional sector in the substitutional sector area 27h is specifically called "a substitutional sector address".

The substitutional sector managing area 27f is stored with a correspondence table showing the corresponding relation between the sector address of a bad sector which has become unavailable inside the data area 27g and the sector address of a substitutional sector to be used in place of the bad sector as shown in FIG. 9.

Figure 10:
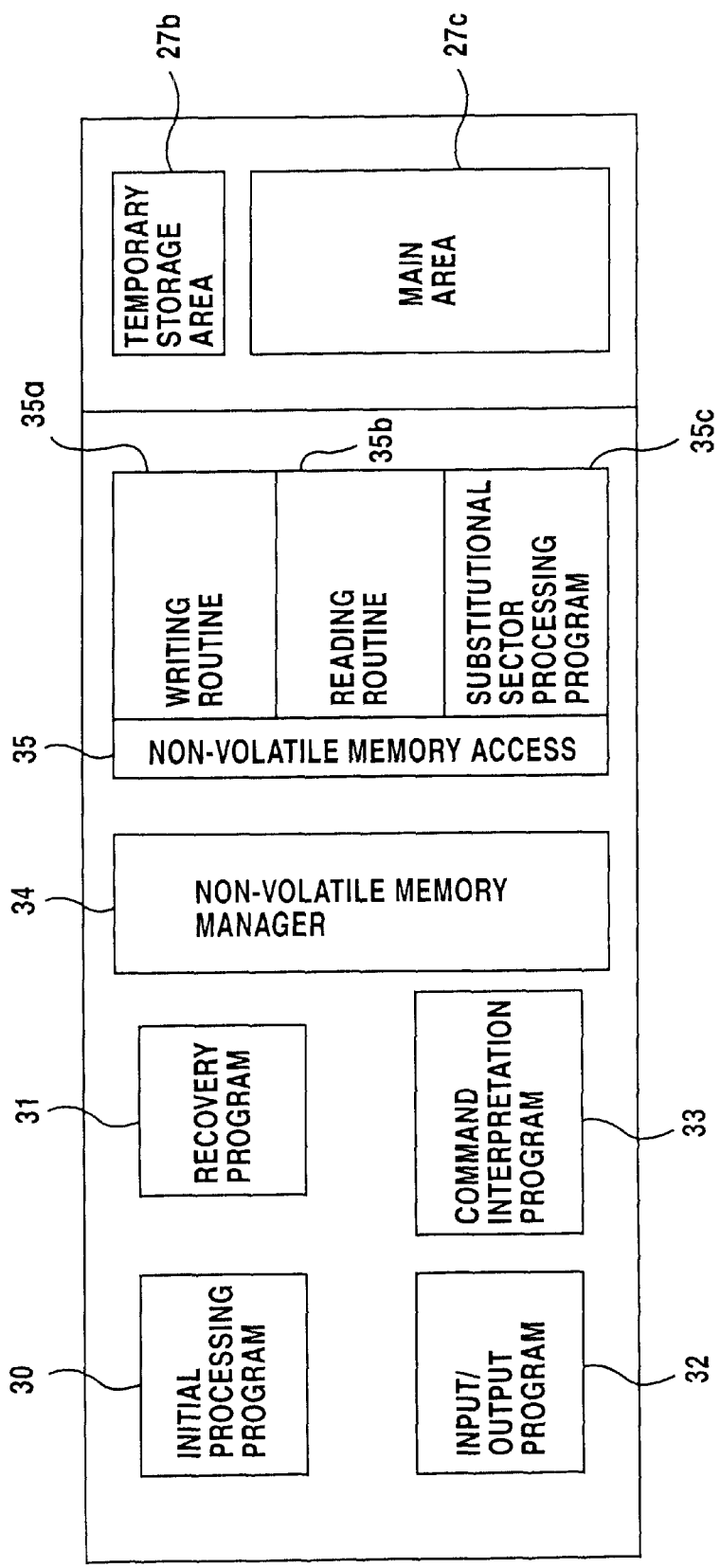
FIG. 10 is a program drawing showing the composition of an application program to be stored inside ROM of FIG. 1 and executed by the CPU.

Details of an application program stored in the ROM 25 and executed by the CPU 21 will now be described. FIG. 10 illustrates a program composition showing the situation in which all the application programs inside the ROM 25 are loaded on the program working area 24b of the RAM 24 (in fact, each application program is loaded in the program working area 24b by being paged from the ROM 25).

An initial processing program 30 shown in FIG. 10 is executed first after the CPU 21 is reset when power is supplied to the IC card 2. The initial processing program 30 moves to a command waiting status after executing various types of initializing processing and starting up a recovery program 31.

On the other hand, under the command waiting status, an input/output program 32 delivers and receives data (command and data D) to and from the host computer 1. The input/output program 32 starts up a command interpretation program 33 when receiving a command from the host computer 1 and transfers the received command (and data D attached thereto) to the command interpretation program 33.

The command interpretation program 33 judges the type of the command received from the input/output 32, and if the command is a writing command, it calculates a sector address specifying a position inside the main area 27 in which data D received from the input/output program 32 should be written and a starting position for writing inside the sector. After the calculation, the command interpretation program 33 transfers data D together with the calculated sector address and the starting position for writing to a non-volatile memory manager 34 for each sector and requests writing data D into the non-volatile memory 27 (the temporary storage area 27b). Then, when receiving a completion notice from the non-volatile memory manager 34, the command interpretation program 33 starts up a recovery program 31 after responding the completion notice to the host computer 1 via the input/output program 32.

The recovery program 31 checks the "writing status" written in each control information area 27d in the temporary storage area 27b of the non-volatile memory 27, and if there is a control information area 27d of which "writing status" shows "buffer full", the recovery program 31 requests the non-volatile memory manager 34 to write out data stored in the temporary storage area 27b to the data area 27g of the main area 27c.

The non-volatile memory manager 34 executes the data access to the non-volatile memory 27 by controlling the non-volatile memory control circuit 26 using a non-volatile memory access 35. More specifically, the non-volatile memory manager 34, if requested to write data D by the command interpretation program 33, writes data D received from the command interpretation program 33 in the temporary storage area 27b for each sector, using a writing routine 35a of the non-volatile memory access 35. Further, the non-volatile memory manager 34, if requested to read out data by the recovery program 31, reads out data D from the temporary storage area 27b for each sector using a reading routine 35b of the non-volatile memory access 35 and writes data D read out from the temporary storage area 27b into the data area 27g within the main area 27c, using the writing routine 35b.

The writing routine 35a of the non-volatile memory access 35, after once deleting (reversing all the "0" bits to "1" by impressing pulse) data remaining in a writing objective sector, writes data in the writing objective sector according to the instruction of the non-volatile memory manager 34. At this time, the writing routine 35a measures the number of times pulse is impressed (the number of times of data deletion processing) as well as a time period required for deletion and the number of times of processing (the number of times of data writing processing) required for writing, using a retry counter (not shown) and a deletion time counter (not shown) set inside the program working area 24b of the RAM 24, and if any counter exceeds the threshold value, judges that the writing objective sector is a ban sector and requests a sector replacing program 35c to lay out a sector. Further, if a mirror file is prepared for a file of which data D, is a portion, the writing routine 35a writes the data D in (the sector of) the mirror file as well.

The reading routine 35b of the non-volatile memory access 35 reads out data stored in the reading objective sector of the temporary storage area 27b according to the instruction of the non-volatile memory manager 34.

The sector replacing program 35c (an alternative sector layout element) of the non-volatile memory access 35 writes the sector address of the bad sector notified by the writing routine 35a in the column of "bad sector address" of the substitutional sector managing area 27f, and writes the sector address of any substitutional sector not yet written in the column of "substitutional sector address" of the substitutional sector managing area 27f in the column of "substitutional sector address". Since layout of a substitutional address is thus completed, the substitutional sector processing program 35c notifies the writing routing 35a of the substitutional sector address written in the substitutional sector managing area 27f.

Flow of processing by the CPU 21 executed according to each application program will now be described. For easy understanding of the contents, processing at the regular time after a power supply is switched on will first described, and then processing at the time when a power supply is switched on will be described below.

Figure 11:
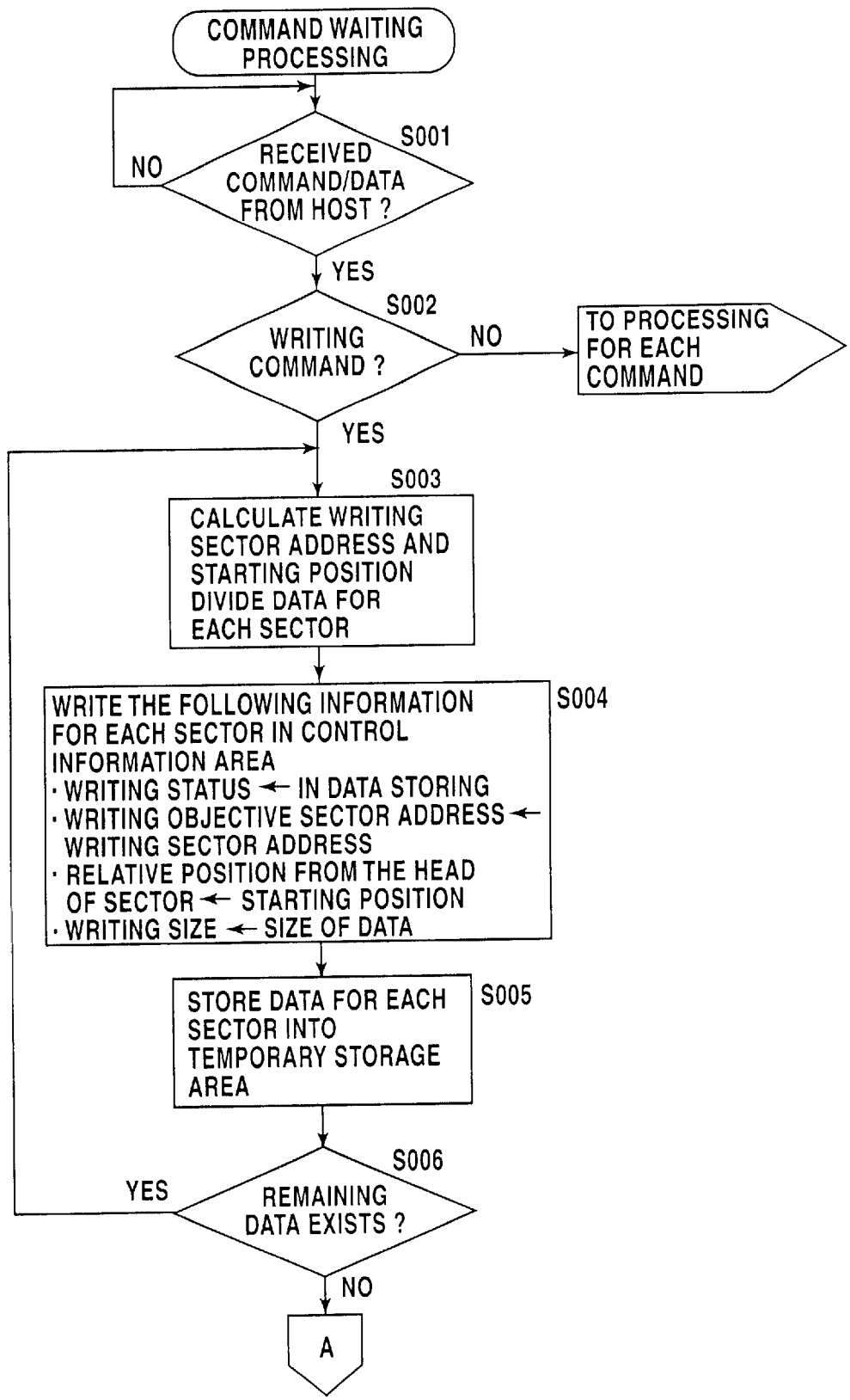
FIG. 11 is a flow chart showing the details of a command waiting processing to be executed while power is supplied to an IC card.
Figure 12:
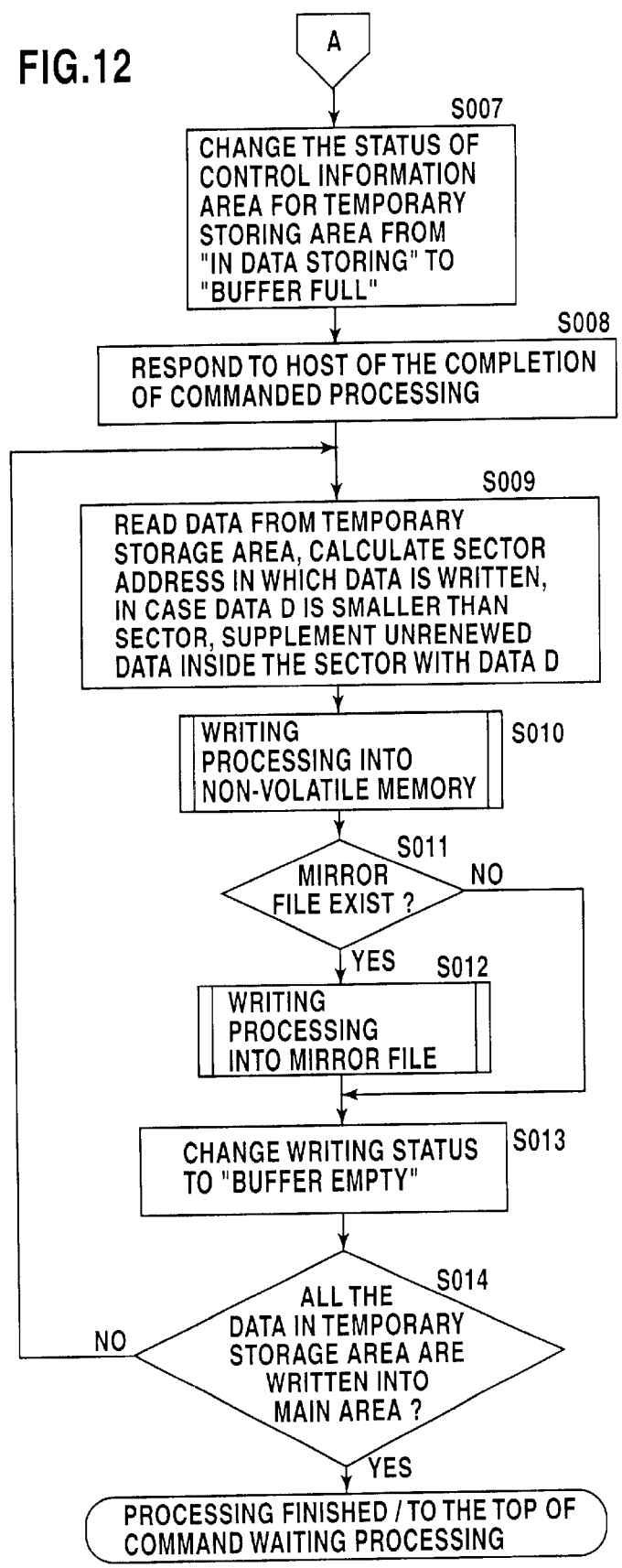
FIG. 12 is a flow chart showing the details of a command waiting processing to be executed while power is supplied to an IC card.

FIG. 11 and FIG. 12 are flow charts showing the flow of processing by each program (the recovery program 31, the input/output program 32, the command interpretation program 33, the non-volatile memory manager 34 and the non-volatile memory access 35) executed while power is being supplied to the IC card 2 (at the regular time).

FIG. 11, the input/output program 32 waits for any command and/or data D which is transmitted from the host computer 1 via the interface circuit 23 and the interface register 22 at step S001 which is executed first after starting. Then, if receiving any command and/or data D, the input/output program 32 transfers the received command and/or data D to the command interpretation program 33 and advances the processing to step S002.

At step S002, the command interpretation program 33 checks if the received command is a writing command (a command ordering new writing or renewal of data D). Then, if the received command is not a writing command, the command interpretation program 33 executes processing corresponding to the command. On the other hand, if the received command is a writing command, the command interpretation program 33 advances the processing to step S003.

At step S003, the command interpretation program 33 calculates the address of a sector inside the data area 27c of the main area 27c in which the received data D should be written (writing sector address), the relative address showing the starting position of writing the data D inside the sector and the size of the data D inside the sector, respectively. Further, if the received data D is written across two sectors, the command interpretation program 33 divides the data D for each sector and calculates as mentioned above for each divided data. After the foregoing, the command interpretation program 33 transfers the results of calculation to the non-volatile memory manager 34 and requests data writing for each sector.

At the next step S004, the non-volatile memory manager 34 writes the following control information for data D received from the command interpretation program 33 (data divided for each sector). Further, if data D is divided for each sector by the command interpretation program 33 at this time, the control information is written for the respective divided pieces of data. When writing control information, the non-volatile memory manager 34 specifies any sector inside the temporary storage area 27b for each pieces of data D (data divided for each sector), writes "in data storing" in the "writing status" of the control information area 27d corresponding to the specified sector, writes the writing sector address calculated at step S003 in the "writing objective sector address" thereof, writes the relative address calculated at step S003 in the "relative position from the head of a sector" thereof and writes the size of data calculated at step S003 in the "writing size" thereof.

At the next step S005, the non-volatile memory manager 34 writes data D (data divided for each sector) received from the command interpretation program 33 in the sector inside the temporary storage area 27b specified at step S004. If data D is divided for each sector by the command interpretation program 33 at this time, each divided data is written in each sector specified for each data. Upon completion of writing all the data D received from the command interpretation program 33 in the temporary storage area 27b, the non-volatile memory manager 34 responds to the command interpretation program 33 as the requester that the processing is completed.

At the next step S006, the command interpretation program 33 checks if all the data D received from the host computer 1 is written in the temporary storage area 27b and, if there is still data D which has not been written, returns the processing to step S003 in order to write the data D in the temporary storage area 27b. On the other hand, if there is no data D which is not written, the command interpretation program 33 notifies the non-volatile memory manager 34 that the writing is completed and advances the processing to step S007.

At step S007, the non-volatile memory manager 34 changes contents of the "writing status" of each control information area 27d inside the temporary storage area 27b from "in data storing" to "buffer full (data exists)". After the change, the non-volatile memory manager 34 returns the processing to the command interpretation program 33.

At the next step S008, the command interpretation program 33 responds to the host computer 1 that the processing is completed via input/output program 32 (equivalent to a data storing completion notifying element). After the response, the command interpretation program 34 starts up the recovery program 31.

At the next step S009, the recovery program 31 retrieves through each control information area 27d of the temporary storage area 27b and specifies one control information area 27d whose "writing status" shows the "buffer full". Then, the recovery program 31 reads out data written in the sector corresponding to the specified control information area 27 (by controlling the reading routine 35b of the non-volatile memory access 35 via the non-volatile memory manager 34) and reads out a writing objective sector address inside the main area 27c (data area 27g) written in the "writing objective sector address" of the specified control information area 27d.

At this time, the recovery program 31 retrieves through the substitutional sector managing area 27f, and if a substitutional sector address is set for the read out writing objective sector address, reads-out the substitutional sector address and replaces the substitutional sector address as a writing objective sector address.

After this, the recovery program 31 reads out the "size of data" from the "writing size" of the specified control information area 27d and checks if the "size of data" is equal to the size of one sector. If the "size of data" is smaller than the size of one sector, the recovery program 31 reads out data from the sector inside the data area 27g shown in the writing objective sector address (substitutional sector address) (by controlling the reading routine 35a of the non-volatile memory access 35 via the non-volatile memory manager 34) and reads out the "relative address" from the "relative position from the head of a sector" of the specified control information area 27d, and then, pastes the data D read out from the temporary storage area 27b in the position shifted by the size of the "relative address" from the head of the data read out from the date area 27g. Thus, a writing objective data, in which the portion not renewed remains as it is, is generated. On the other hand, if the "size of data" is equal to the size of one sector, the data D read out of the temporary storage area 27b is made a writing objective data as it is.

Figure 13:
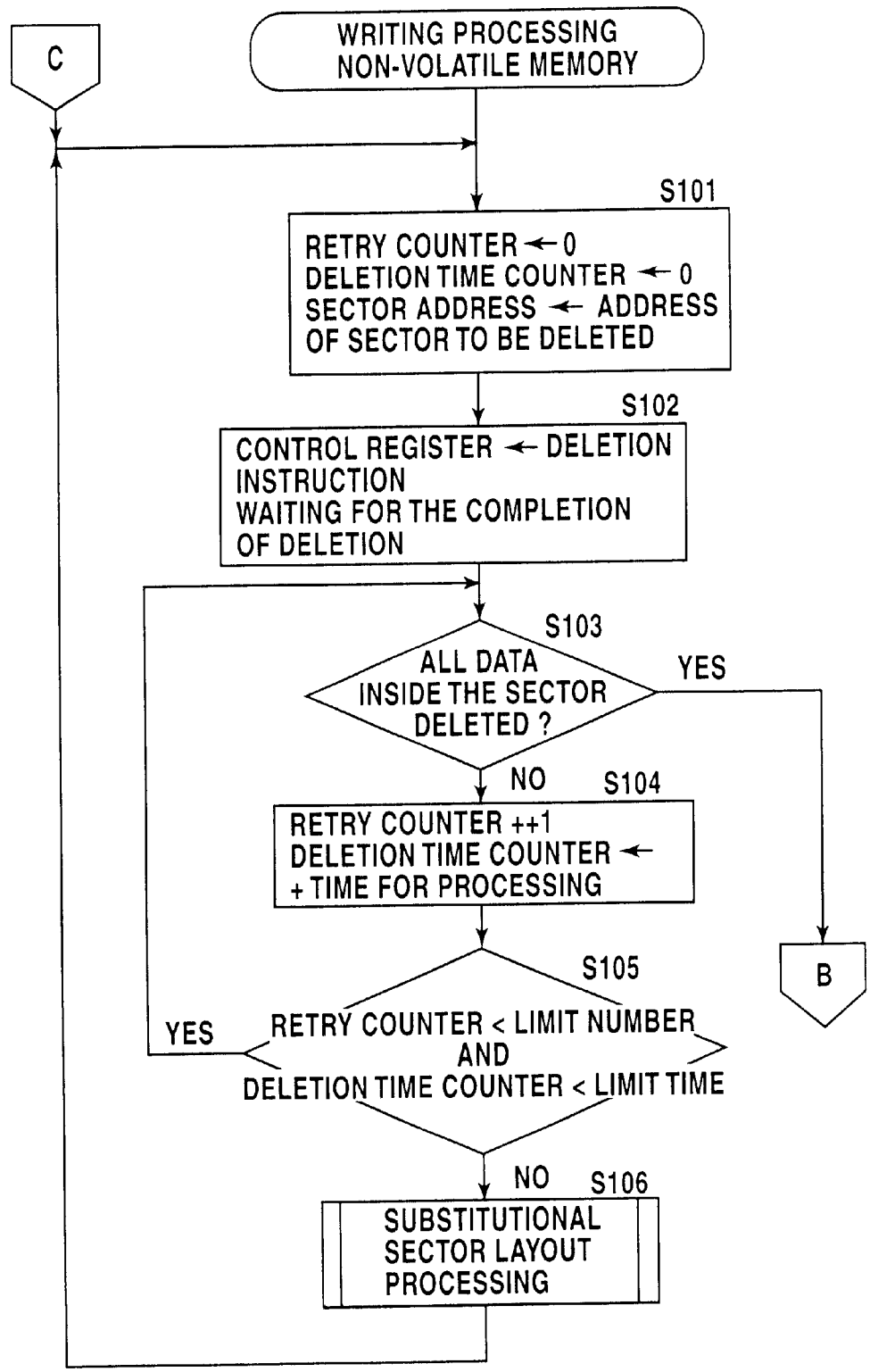
FIG. 13 is a flow chart showing the details of the writing processing to a non-volatile memory to be executed at S010 and S012 of FIG. 12 as well as at S304 and S306 of FIG. 16.
Figure 14:
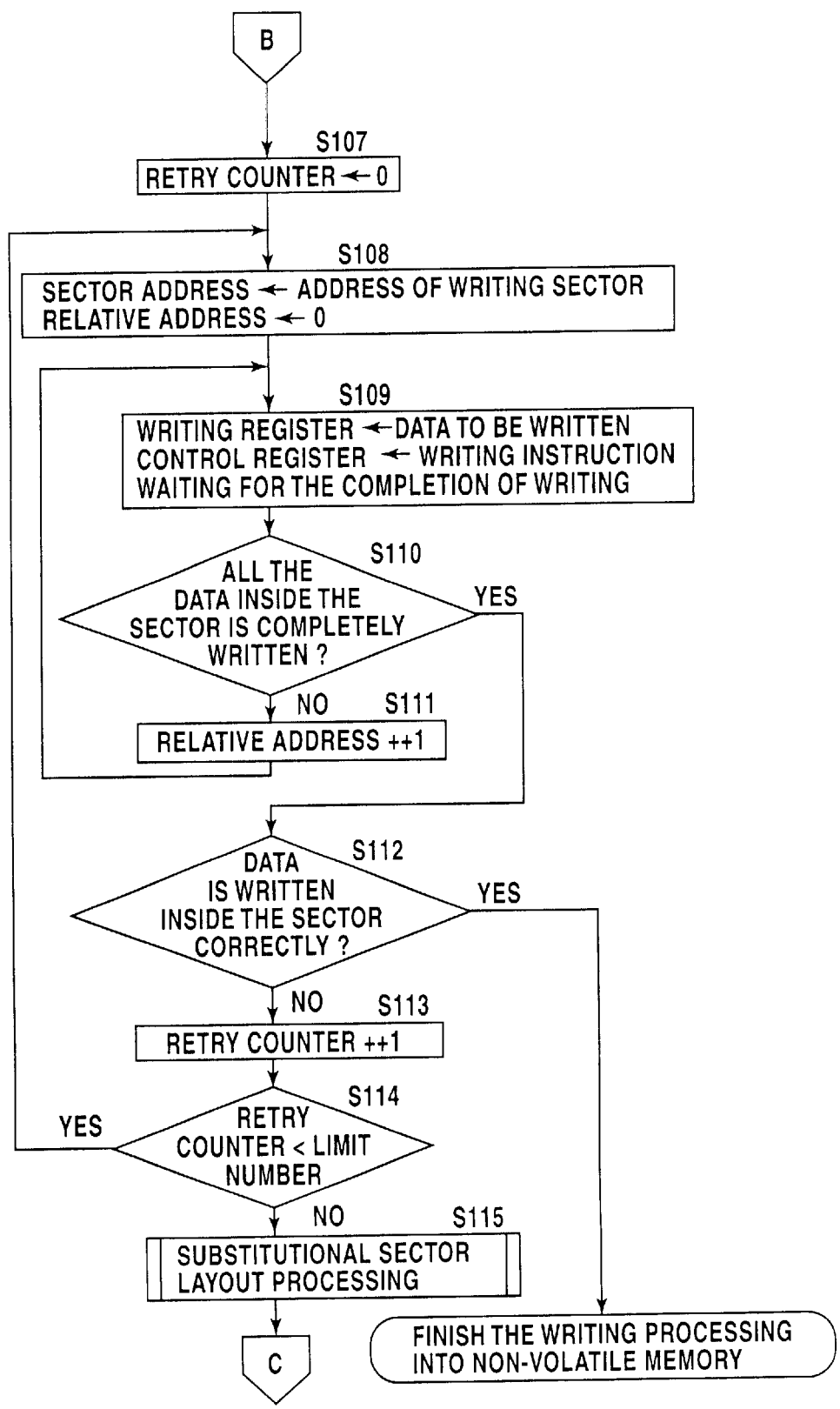
FIG. 14 is a flow chart showing the details of the writing processing to a non-volatile memory to be executed at S010 and S012 of FIG. 12 as well as at S304 and S306 of FIG. 16.

At the next step S010, the recovery program 31 requests writing processing in the non-volatile memory 27 to the non-volatile memory manager 34. FIG. 13 and FIG. 14 show a flow chart of the writing routine 35a which is conducted by the requested non-volatile memory manager 34 using the non-volatile memory access 35.

At the first step S101 of the writing routine 35, the non-volatile memory manager 34 sets the initial value "0" in the retry counter and the deletion time counter (both are software counters) set inside the program working area 24b of the RAM 24, and sets the address of the sector to be deleted (the writing objective sector address obtained at S009 (the substitutional sector address)) in the sector address register of the non-volatile memory control circuit 26.

At the next step S102, the non-volatile memory manager 34 sets a deletion instruction in the control register of the non-volatile memory control circuit 26. When the deletion instruction is set, the non-volatile memory control circuit 26 executes the deletion of data in the sector corresponding to the address set in the sector address register. The deletion is executed for every predetermined number of bits and is executed by leaving "1" bits as they are and reversing "0" bits to "1". Therefore, deletion times are varied according to the number of "0" bits. Further, since the deletion is completed when all the bits are "1", the non-volatile memory control circuit 26 sets a deletion completed status in the control register.

On the other hand, the non-volatile memory manager 34 advances the processing to step S103 immediately after the deletion instruction at step S102. At step S103, the non-volatile memory manager 34 checks if the deletion completed status is set in the control register, and if the deletion completed status is not yet set, the processing is advanced to step S104.

At step S104, the non-volatile memory manager 34 increments the retry counter by one and advances the deletion time counter by the amount of time spent for the processing (the time passed from when step S101 or the previous step S104 is executed).

At the next step S105, the non-volatile memory manager 34 checks whether or not the value of the try counter is below the predetermined limited number of times and the value of the deletion time counter is below the predetermined deletion limit time. Then, if the value of the retry counter is below the predetermined retry limit number of times and the value of the deletion time counter is below the predetermined deletion limit time, the non-volatile memory manager 34 returns the processing to step S103.

Figure 15:
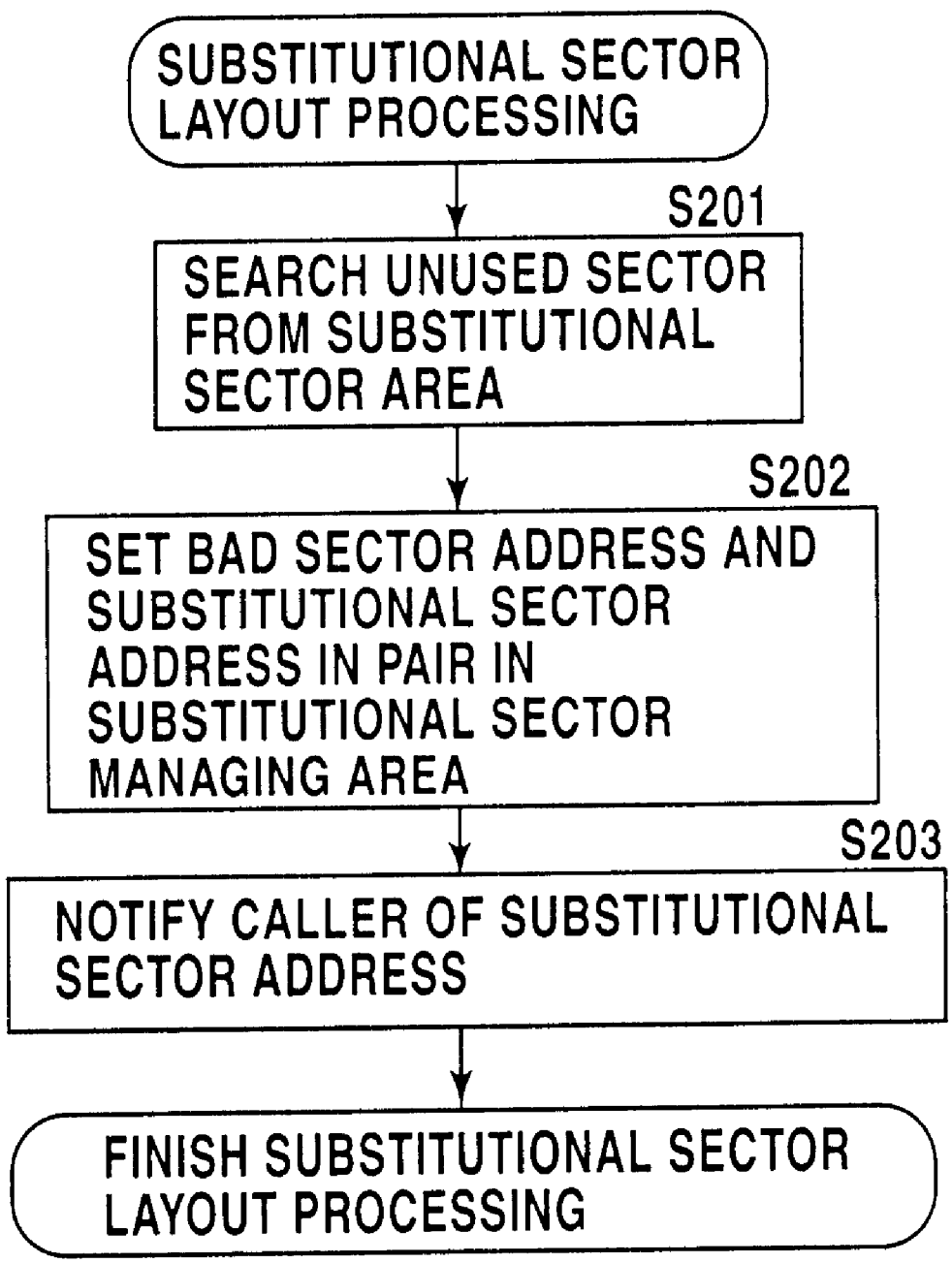
FIG. 15 is a flow chart showing the details of the substitutional sector layout processing to be executed at S106 of FIG. 13.

On the contrary, if the value of the retry counter reaches the predetermined retry limit number of times or if the value of the deletion time counter reaches the predetermined deletion limit time, the non-volatile memory manager 34 judges that the writing objective sector is unavailable (equivalent to a judging element) and advances the processing to step S106. At step S106, the non-volatile memory manager 34 requests the substitutional sector layout processing to the substitutional sector processing program 35c (a substitutional sector layout element) of the non-volatile memory access 35. FIG. 15 is a flow chart showing the substitutional sector layout processing.

At the first step S201, after entering the substitutional sector layout processing, the substitutional sector processing program 35c searches an unused sector from the substitutional sector area 27h.

At the next step S202, the substitutional sector processing program 35c makes the writing objective sector address set in the sector address register at step S101, i.e., the bad sector address, and the address of a sector searched at step S201, i.e., the substitutional sector address, correspond to each other and sets them in the substitutional sector managing area 27f.

At the next step S203, the substitutional sector processing program 35c notifies the non-volatile memory manager 34 of the address of the sector (the substitutional sector address) searched at S201 and finishes the substitutional sector layout processing. The non-volatile memory manager 34, which is notified of the substitutional sector address, returns the processing to step S101 in order to write the writing objective data into the sector of the substitutional sector area 27h shown by the substitutional sector address. In this case, at step S101, the non-volatile memory manager 34 sets the substitutional sector address notified of by the substitutional sector processing program 35c in the sector address register of the non-volatile memory control circuit 26.

If it is judge at step S103 that the deletion completed status is set in the control register as a result of repeating the loop processing of the step S101 through step S106 as described above, the non-volatile memory manager 34 advances the processing to step S107. At step S107, the non-volatile memory manager 34 sets the initial value "0" in the retry counter developed inside the program working area 24b of the RAM 24.

At the next step S108, the non-volatile memory manager 34 sets the sector address of the writing objective sector (the same sector address as the one set in the sector address register by executing the latest step S101) in the sector address register of the non-volatile memory control circuit 26, and sets the initial value "0" in the relative register of the non-volatile memory control circuit 26.

At the next step S109, the non-volatile memory manager 34 sets the writing objective data generated at step S009 in the writing register of the non-volatile memory control circuit 26, and sets a writing instruction in the control register of the non-volatile memory control circuit 26. When the writing instruction is set, the non-volatile memory control circuit 26 writes, based on the sector address set in the sector address register and the relative address set in the relative address register, the data written in the position shifted from the head of the writing register by the size of the relative address in the position shifted from the head of the sector corresponding to the sector address (a sector in the data area 27g or the substitutional sector area 27h) by the size of the relative address.

At the next step S110, the non-volatile memory manager 34 checks, based on whether or not the relative address set in the relative address register reaches the length of a sector, if all the data is written in the sector. Then, if the relative address does not reach the length of a sector yet, the non-volatile memory manager 34 advances the processing to step S111.

At S111, the non-volatile memory manager 34 increments the relative address set in the relative address register by one. After this, the non-volatile memory manager 34 returns the processing to step S109.

If it is judged at step S110 that the relative address reaches the length of a sector as a result of repeating the loop processing of step S109 through step S111 as described above, the non-volatile memory manager 34 advances the processing to step S112.

At step S112, the non-volatile memory manager 34 reads out a newly-written data from the sector corresponding to the sector address set in the sector address register of the non-volatile memory control circuit 26 at step S108, and compares it with the writing objective data set in the writing register. Then, if both do not coincide, the non-volatile memory manager 34 judges that data is not correctly written in the sector and advances the processing to step S113.

At step S113, the non-volatile memory manager 34 increments the retry counter by one.

At the next step S114, the non-volatile memory manager 34 checks if the value of the retry counter is below the predetermined retry limit number of times. Then, if the value of the retry counter is below the predetermined retry limit number of times, the non-volatile memory manager 34 returns the processing to step S108.

On the contrary, if the value of the retry counter reaches the predetermined retry limit number of times, the non-volatile memory manager 34 judges that the writing objective sector is unavailable (equivalent to a judging element) and advances the processing to step S115. At step S115, the non-volatile memory manager 34 requests the substitutional sector processing program 35c of the non-volatile memory access 35 (a substitutional sector layout element) of the substitutional sector layout processing (FIG. 15). When the substitutional sector layout processing is completed, the non-volatile memory manager 34 returns the processing to step S101.

On the other hand, if it is judged that a newly-written data and the writing objective data set in the writing register coincide at step S112, the non-volatile memory manager 34 judges that data is correctly written in the sector, finishes the writing in the non-volatile memory and notifies the recovery program 31 of the completion of the processing.

The recovery program 31, which is notified of the completion of the processing, checks at step S011 of FIG. 12 if a mirror file is prepared for the file including the sector in which the writing objective data is written at step S010. The check is conducted by looking at the node file of the parent file of the file. Then, if a mirror file is not prepared, the recovery program 31 advances the processing to step S013. On the contrary, if a mirror file is prepared, the recovery program 31 requests the non-volatile memory manager 34 of the writing processing to the mirror file. The requested non-volatile memory manager 34 writes the same writing objective data as the one written at step S010 into the mirror file at the next step S012. In the data writing processing to the mirror file, the non-volatile memory manager 34 executes a processing which is absolutely the same as one at step S010 (writing processing to the non-volatile memory), except that the sector to which the writing objective data is written is the one in the mirror file. When the writing processing to the mirror file is completed, the non-volatile memory manager 34 motives the recovery program 31 of the completion of the processing, and the recovery program 31 notified of the completion of the processing advances the processing to step S013.

At step S013, the recovery program 31 changes the "writing status" of the control information area 27d specified at step S009 to "buffer empty (no written date)".

At the next step S014, the recovery program 31 checks to see if the data written in all the sectors (a sector inside the temporary storage area 27b) corresponding to each control information area 27d whose "writing status" shows "buffer full" is completely written into the data area 27g or the substitutional sector area 27h of the main area 27c. Then, if the data written in all the sectors is completely written out yet, the recovery program 31 returns the processing to step S009. On the contrary, if the data written into all the sectors are completely written into the data are 27g, the recovery program 31 finishes the command waiting processing of this time, and returns the processing to step S001 in order to wait for the next command. The processing of step S009 through step S014 as described above corresponds to the writing element.

Figure 16:
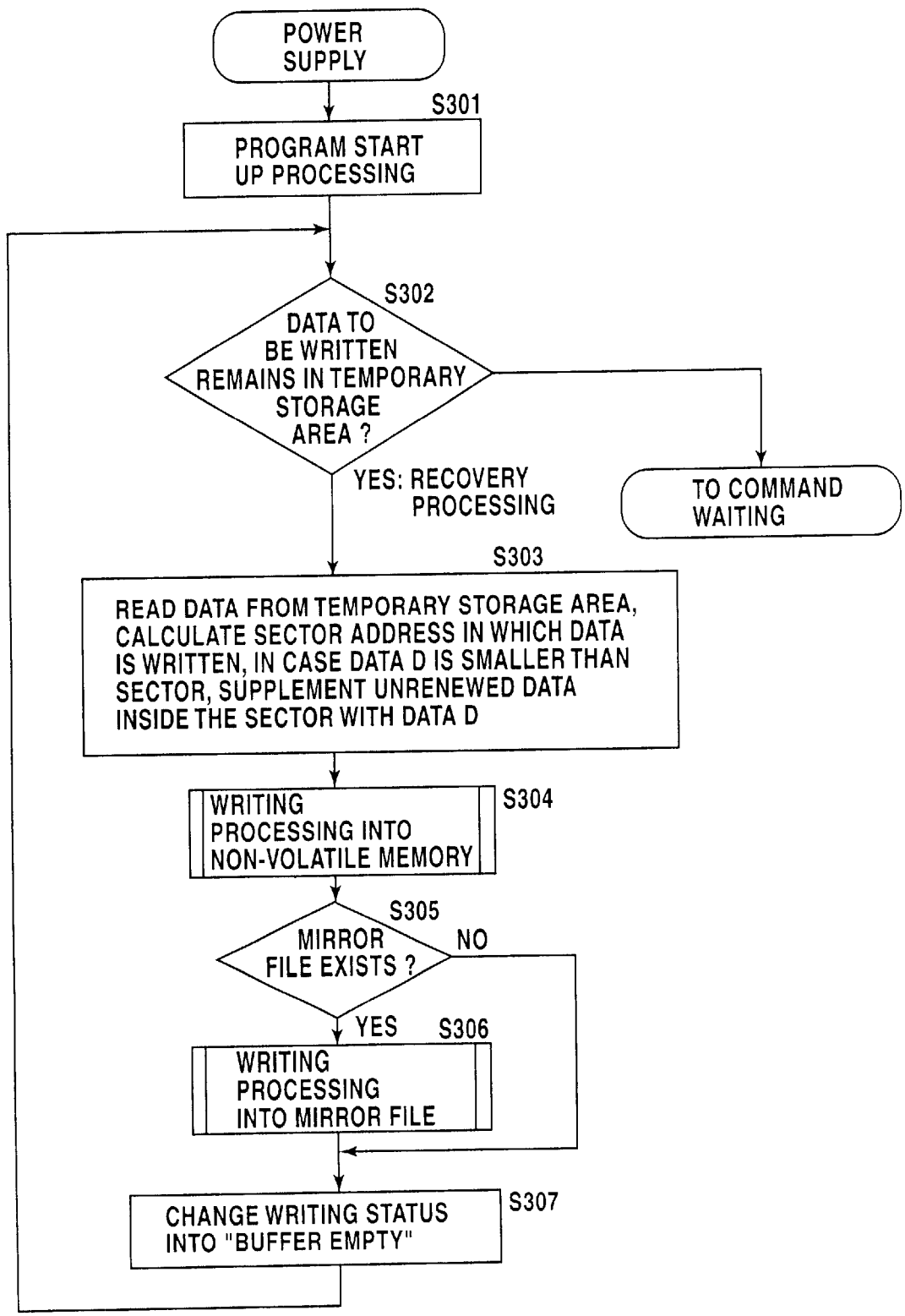
FIG. 16 is a flow chart showing the details of the processing to be executed at the time when power is supplied to an IC card.

The processing at the time when a power supply to the IC card 2 is switched on (including the time when a power supply is switched on again after abnormal power interruptions, such as power failures, the time when a power supply is switched on again after normal power shut down, the time of reset at the occurrence of an error, etc.) will no be described. FIG. 16 is a flow chart showing the flow of processing by each program (the initial processing program 30, the recovery program 31) (equivalent to a writing element) starting with the fact that a power supply to the IC card 2 is switched on as a trigger.

In FIG. 16, at step S301 which is executed first after starting, the initial processing program 30 executes the program start up processing. This means that the initial processing program 30 initializes the non-volatile memory manager 34 and the non-volatile memory access 35 and starts up the recovery program 31.

At the next step S302, the recovery program 31 checks the "writing status" of each control information area 27d inside the temporary storage area 27b of the non-volatile memory 27. Then, if the "writing status" corresponding to any sector shows "buffer full (data exists)", the recovery program 31 advances the processing to step S303.

At step S303, the recovery program 31 retrieves through each control information area 27d in the temporary storage area 27b and specifies one control information area 27d whose "writing status" shows "buffer full". The, the recovery program 31 reads out data D written in the sector corresponding to the specified control information area 27 by controlling the reading routine 35b in the non-volatile memory access 35 via the non-volatile memory manager 34, and reads the writing objective sector address inside the main area 27c (the data area 27g) written in the "writing objective sector address" of the specified control information area 27d.

At this time, the recovery program 31 retrieves through the substitutional sector managing area 27f, and if a substitutional sector address is set for the read-out writing objective sector address, reads out the substitutional sector address and replaces the substitutional sector address as the writing objective sector address.

After this, the recovery program 31 reads the "size of data" from the "writing size" out the specified control information area 27d, and checks if the "size of data" is equal to the size of a sector. Then, if the "size of data" is less than the size of a sector, the recovery program 31 reads the data out the sector inside the data area 27g shown in the writing objective sector address (the substitutional sector address) by controlling the reading routine 35a of the non-volatile memory access 35 via the non-volatile memory manager 34, and reads the "relative address" out the "relative position from the head of a sector" of the specified control information area 27d. Then, the recovery program 31 pastes the data read out from the temporary storage area 27b in the position shifted from the head of the data read out from the data area 27g by the size of the "relative address". Thus, a writing objective data, in which the portion not renewed remains as it is, is generated. On the other hand, if the "size of data" is equal to the size of one sector, the data D read out of the storage temporary are 27b is made a writing objective data as it is.

At the next step S304, the recovery program 31 requests writing processing in the non-volatile memory 27 to the non-volatile memory manager 34. The requested non-volatile memory manager 34 executes the writing routine 35a shown in FIG. 13 and FIG. 14 and writes the requested data D into the data area 27g or the substitutional sector area 27h of the main area 27c.

At the next step S305, the recovery program 31 checks if a mirror file is prepared for the file including the sector in which the writing objective data is written in step S304. The check is conducted by looking at the node file of the parent file of the file. Then, if a mirror file is not prepared, the recovery program 31 advances the processing to step S307. On the contrary, if a mirror file is prepared, the recovery program 31 requests the non-volatile memory manager 34 of the writing processing to the mirror file. The requested non-volatile memory manager 34 writes the same writing objective data as the one written at step S303 into the mirror file at the next step S306. In the data writing processing to the mirror file, the non-volatile memory manager 34 executes a processing which is identically the same as one at step S304 (writing processing to the non-volatile memory), except that the sector to which the writing objective data is written is the one in the mirror file. When the writing processing to the mirror file is completed, the non-volatile memory 34 notifies the recovery program 31 of the completion of the processing, and the recovery program 31 notified of the completion of the processing advances the processing to step S307.

At step S307, the recovery program 31 changes the "writing status" of the control information area 27d specified at step S303 to "buffer empty (no written data)". Then, the recovery program 31 returns the processing to step S302.

If it is judged at step S302 that the data written in all the sectors corresponding to each control information area 27d whose "writing status" shows "buffer full" is completely written into the data area 27g or the substitutional sector area 27h of the main area 27c as a result of repeating the loop processing of step S302 through step S307 as described above, the recovery program 31 finishes the processing at the time when power supply is switched on and requests the input/output program 32 of execution of the command waiting processing.

The flow of data writing into the IC card 2 according to the embodiment composed as above will now be described.

Assuming that, in order to write data D into an IC card 2, the IC card 2 is connected to the interface device 11 of the host computer 1, and then, a power is supplied to the internal circuit of the IC card 2 from the side of the host computer 1 and the processing at the time when a power supply is switched on shown by FIG. 16 is executed. At this time, since data D is not stored inside the temporary storage area 27b of the non-volatile memory 27 unless abnormal power cuts such as power failures occur after a power supply to the internal circuit of the previous IC card 2 is switched on, writing data out of the temporary storage area 27b to the main area 27c by the recovery program 31 is never conducted, but the command waiting processing of FIG. 11 is executed.

While the command waiting processing is executed, if a writing command to write data D into the non-volatile memory 27 is notified from an application program 12 of the host computer 1, the command interpretation program 33 requests the non-volatile memory manager 34 to write data D received from the host computer 1 in the temporary storage area 27b. The requested non-volatile memory manager 34 writes the received data D in the temporary storage area 27b in the non-volatile memory 27 utilizing the writing routine 35a of the non-volatile memory access 35 (steps S004, S005).

At the time when the writing is completed, the data D is written in the complete form in the non-volatile memory 27. Therefore, even if power supply to the IC card 2 is interrupted due to the occurrence of power failures, etc., the host computer 1 is not required to rewrite the data D into the IC card 2. For this reason, the command interpretation program 33 responds to the host computer 1 that the processing of the command is completed when the data writing into the temporary storage area 27b by the non-volatile memory manager 34 is completed (step S008).

To the contrary, if power supply to the IC card 2 is interrupted as a result of the occurrence of power failures, etc. before the data writing into the temporary storage area 27b by the non-volatile memory manager 34 is completed, the host computer 1 might have to write the data D into the IC card 2 again in order to renew the data inside the IC card 2 because it has not received the response that the processing of the command is completed. However, even in this case, since data and each node file written in the main area 27c are retained without being destroyed, even if the data D is not rewritten by the host computer 1, it is possible to refer to or to renew the data written in the main area 27c by other host computers.

After the response that the processing of the command is completed to the host computer 1, the command interpretation program 33 up the recovery program 31. The recovery program 31 controls the non-volatile memory manager 34, and reads the data D for each sector out the temporary storage area 27b and writes them into the main area 27c. The fact that the data D written in each sector of the temporary storage area 27b is written into in the main area 27c can be confirmed based on the fact that the "writing status" of the control information area 27d being corresponded to each sector of the temporary storage area 27b is changed from "buffer full" to "buffer empty".

In case a sector in the data area 27g into which the data D is to be written is unavailable at the time of data writing into main area 27c (that is, in case data cannot be deleted despite spending more than the predetermined time, in case data cannot be deleted despite conducting deletion processing for more than the predetermined number times, or in case data cannot be written despite conducting writing processing for more than the predetermined number of times), the substitutional sector processing program 35c lays out a sector inside the substitutional sector area 27h as a substitutional sector, and manages the correspondence of the sector address of a bad sector and the sector address of a substitutional sector with the substitutional sector managing area 27f (S106, S115). Therefore, it is possible to conduct an autonomous rearrangement of data inside the IC card 2 without loading the host computer 1.

In addition, when data is written into a file having a mirror file in the main area 27c, the non-volatile memory manager 26 writes the writing objective data in the sector composing the mirror file as well (S012).

On the other hand, there are such situations after responding to the host computer 1 that the processing of the command is completed and before all the data D is completely written out of the temporary storage area 27b into the main area 27c, power supply from the host computer 1 to the IC card 2 is interrupted due to power failure, etc., and then the power failure is restored and power supply from the host computer 1 to the IC card 2 is resumed; or in the above mentioned period, because the CPU of the IC card 2 stopped movement due to movement failure, etc., the IC card 2 is once removed from the interface device 11 (abnormal power cut) and then reconnected (resuming of power supply). In such cases, the data D inside the temporary storage area 27b, of which writing processing into the main area 27c is not completed yet, is preserved without disappearing even if a power interruption occurs. Since the temporary storage area 27b stores only data D itself which is the writing objective smaller than a file inside the main area 27c, the temporary storage area 27b may be far smaller than the main area 27c. Therefore, the entire volume of data retained by the overall IC card 2 does not become enormous.

In the processing of FIG. 16 which is executed at the time when a power supply to the IC card 2 is switched on again as mentioned above, since it is judge that the data D remains inside the storage area for temporary storing, the data D remaining inside the temporary storage area 27b is written out into the main area 27c.

As described above, in this embodiment, the temporary storage area 27b being the non-volatile storage area in which data D ordered to be written in the main area 27c by the host computer 1 is temporarily stored is prepared in addition to the main area 27c being the non-volatile storage area to which data is referred by the host computer 1, and the data D is written out of the temporary storage area 27b into the main area 27c after the data D from the host computer 1 is completely written into the temporary storage area 27b and the data D not yet written out of the temporary storage area 27b is written into the main area 27c at the time when a power supply is switched on. Therefore, even if power interruptions occur while data D is written from the host computer 1 into the IC card 2, data inside the main area 27c is never destroyed and, even if power interruptions occur while data is written out of the temporary storage area 27b into the main area 27c, data D inside the main area 27c can be restored based on data D remaining inside the temporary storage area 27b.

A second embodiment of the present invention is characterized in that, when a bad sector is produced inside a data area 27g of a non-volatile memory 27, a substitutional sector preserved for the exclusive use is not laid out but an unused sector inside the data area 27g is laid out unlike the first embodiment.

Figure 17:
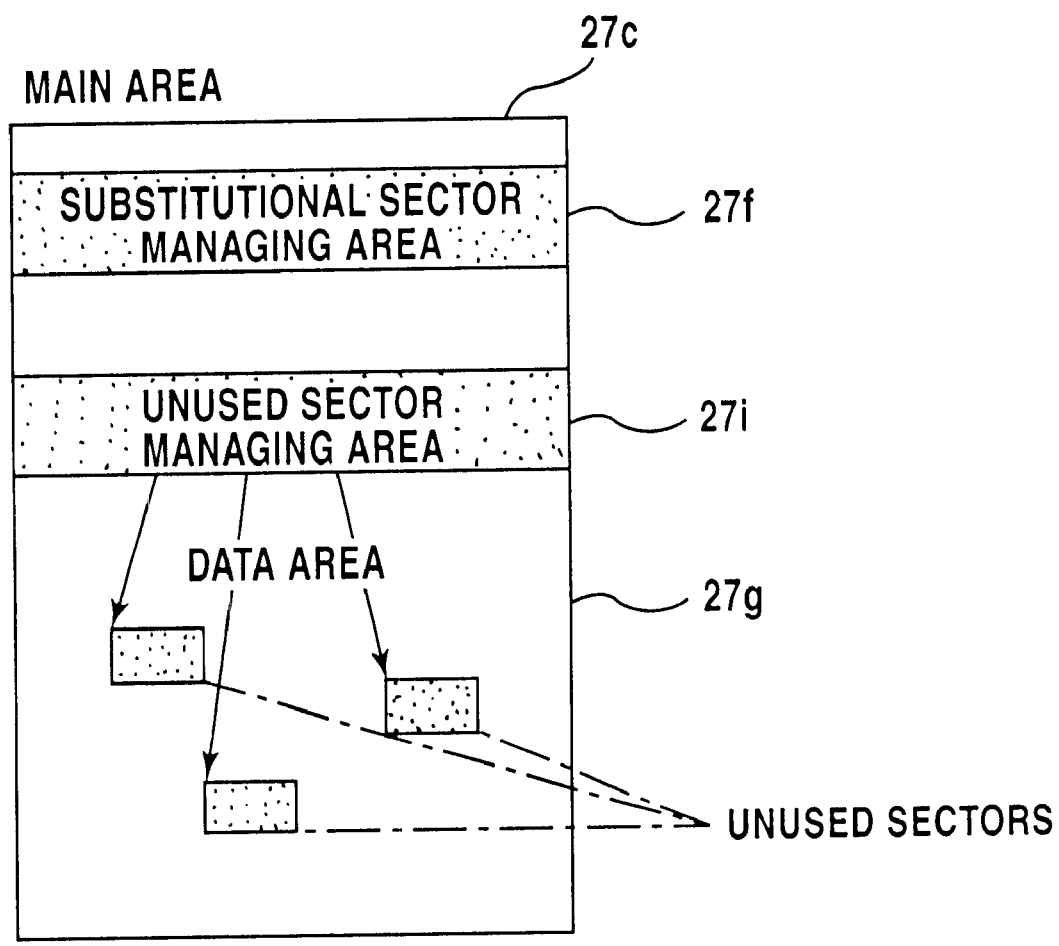
FIG. 17 is a memory map showing the structure of the main area inside the non-volatile memory according to a second embodiment of the present invention.

FIG. 17 is a memory map showing the structure of a main area 27c inside a non-volatile memory 27 of an IC card 2 according to the second embodiment. As shown in FIG. 17, a substitutional sector area 27h is not prepared in the main area 27c in the second embodiment. As a substitute, an unused sector managing are 27i is prepared for managing all the unused sectors of the data area 27g (all the sectors of the data area 27g in the initial status before data is written).

Figure 18:
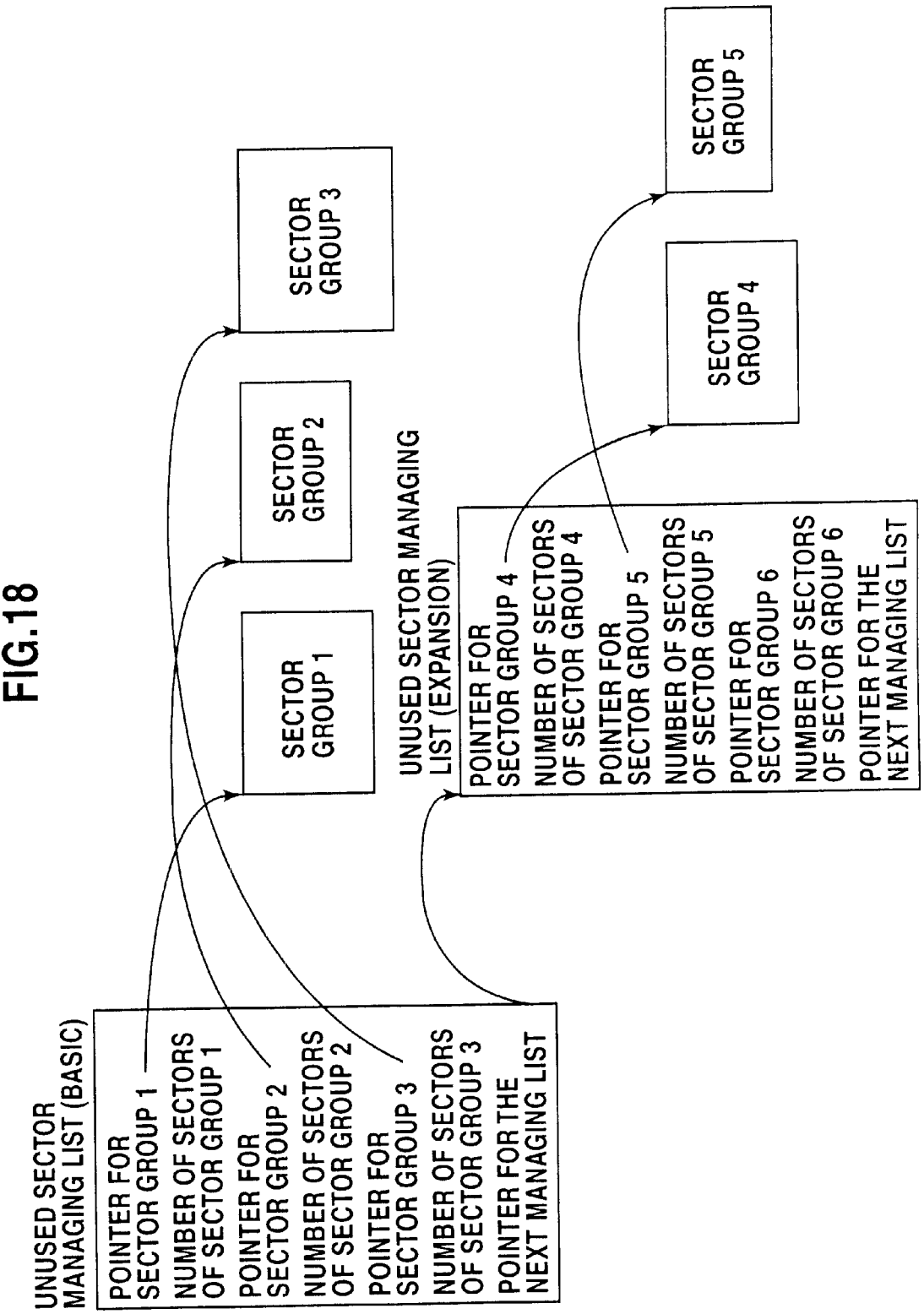
FIG. 18 is a drawing showing the structure of unused sector managing lists stored in the unused sector managing area of FIG. 17.

FIG. 18 shows the composition of an unused sector managing list as a managing element for unused sectors stored in the unused sector managing area 27i. As shown in FIG. 18, each unused sector managing list is the list for managing unused sector for a sector group in such a way that, when unused sectors exist consecutively, the consecutive plurality of sectors are managed as a sector group, and when one unused sector exists between sectors in use, the one unused sector is managed as a sector group. Specifically, each unused sector managing list records the pointer designating the head address of each sector group and the number of sectors in each sector group respectively for each sector group.

Figure 19:
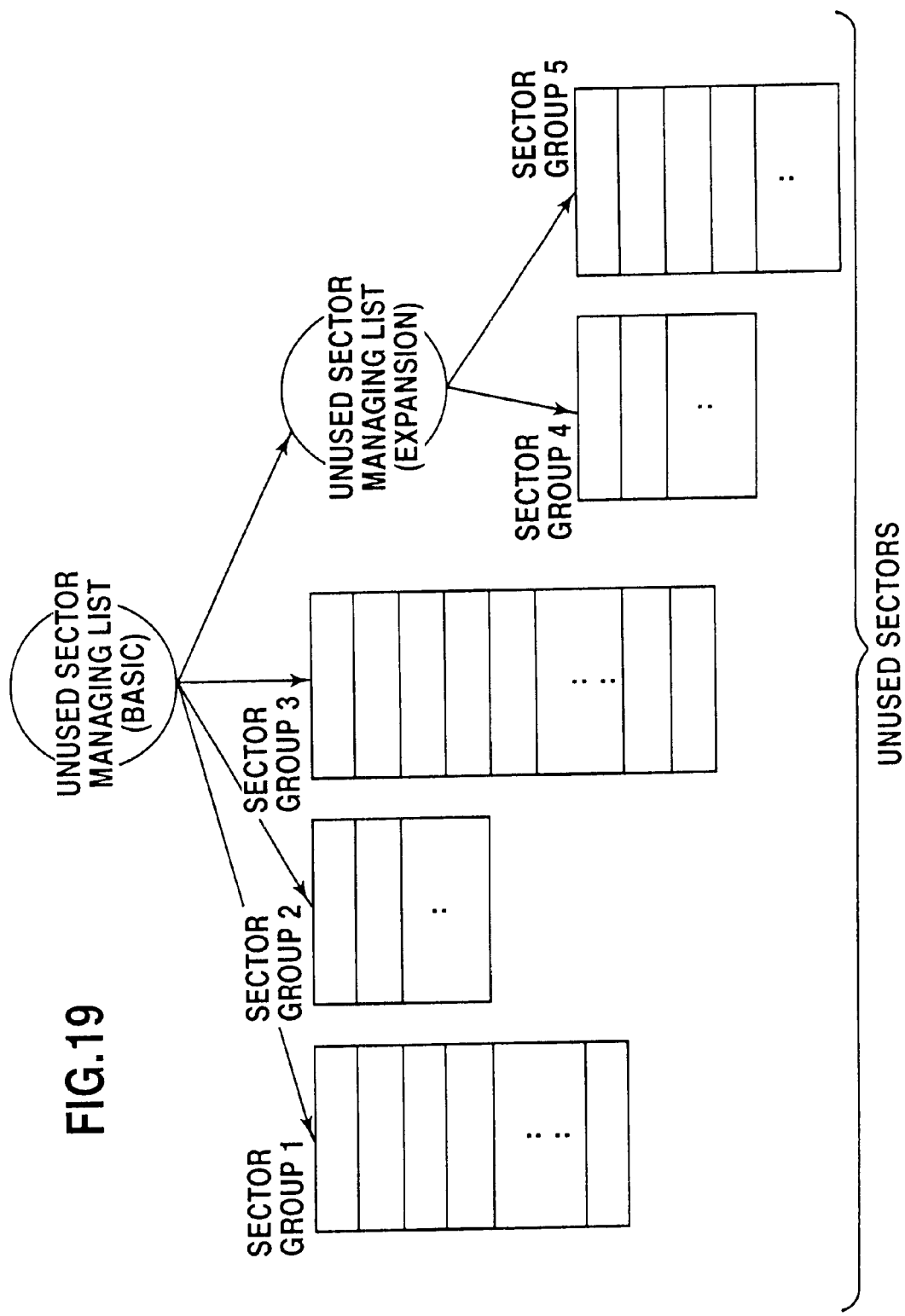
FIG. 19 is a drawing showing the tree structure of sector groups managed by the unused sector managing lists of FIG. 18.

If there are a great number of unused sectors, as shown in FIG. 18, an unused sector managing list for expansion is prepared in addition to the basic unused sector managing list in the unused sector managing area 27i. When such an unused sector managing list for expansion is prepared, a pointer showing the head address of the unused sector managing list for expansion is recorded in the basic unused sector managing list. The unused sector managing list for expansion has identically the same structure as that of the basic unused sector managing list. This means that the unused sector managing list for expansion manages unused sectors for each sector group and becomes the basic unused sector managing list for other unused sector managing lists for expansion. To summarize the foregoing, as shown in FIG. 19, a plurality of unused sector managing lists mutually form tree structures and manage a plurality of unused sector groups, respectively.

When a sector managed by a certain unused sector managing list comes in use, the number of sectors of a sector group, including the newly-used sector described in the unused sector managing list, decrements. Moreover, an unused sector forming a sector group by itself comes in use, the description about the sector group in the unused sector managing list which managing the sector group is deleted.

Since other hardware compositions in the second embodiment is absolutely the same as those in the first embodiment, description thereof is omitted.

Since programs stored in ROM 25 and executed by a CPU 21 in the second embodiment is identically the same as those of the first embodiment except that the flow of processing of a substitutional sector processing program 35c is different, description thereof is omitted.

Figure 20:
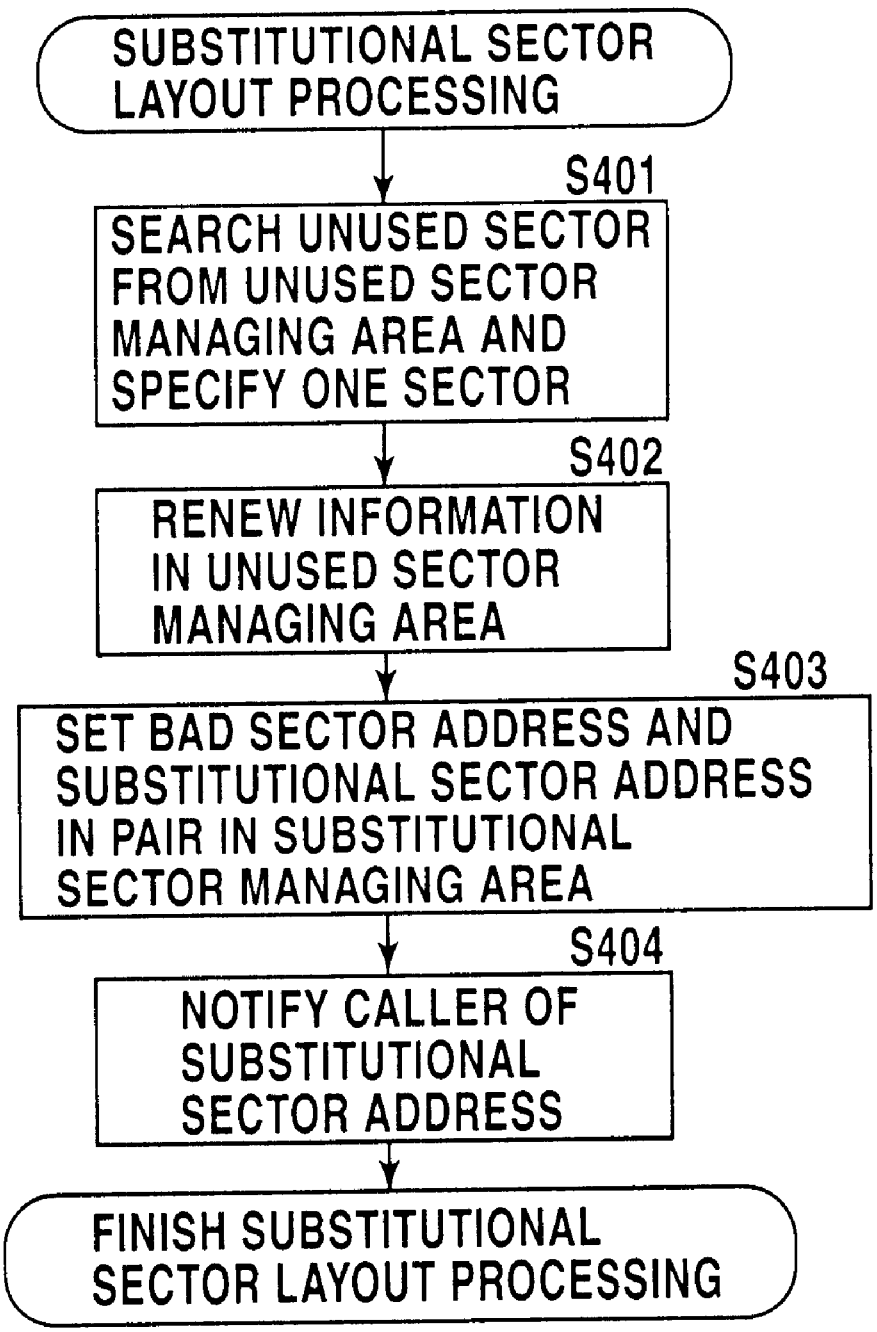
FIG. 20 is a flow chart showing the details of the substitutional sector layout processing executed at S106 of FIG. 13 in the second embodiment of the present invention.

Details of the substitutional sector layout processing executed by the substitutional sector processing program 35c (a substitutional sector layout element) in step S106 of FIG. 13 and step S115 of FIG. 14 in the second embodiment will be hereinafter described based on FIG. 20.

At step S401, which is the first step after entering the substitutional sector layout processing, the substitutional sector processing program 35c searches unused sectors based on any unused sector managing list inside the unused sector managing area 27i and specifies (cuts out) any one unused sector.

At the next step S402, the substitutional sector processing program 35c renews the information in the unused sector managing list managing the unused sector specified at step S401 in the manner described above.

At the next step S403, the substitutional sector processing program 35c makes the writing objective sector address set in the sector address register, i.e., the bad sector address, and the address of an unused sector specified at S401, i.e., the substitutional sector address, correspond to each other and sets them in the substitutional sector managing area 27f.

At the next step S404, the substitutional sector processing program 35c notifies the non-volatile memory manager 34 of the address of the sector searched at step S401 and finishes the substitutional sector layout processing. The non-volatile memory manager 34, which is notified of the substitutional sector address, returns the processing to step S101 in order to write data into the sector of the substitutional sector area 27h shown by the substitutional sector address.

Since the flow of other processing in the second embodiment is the same as that of the first embodiment, description thereof is omitted.

The third embodiment of the present invention is characterized in that sector managing areas are prepared respectively for each sector inside the data area 27g of the non-volatile memory 27; that sectors, whose number of times of writing recorded in the sector managing area reaches the predetermined number, are regarded as bad sectors; and that when a bad sector is produced, a substitutional sector is laid out by changing the description in a sector managing area for any unused sector.

Figures 21, 22:
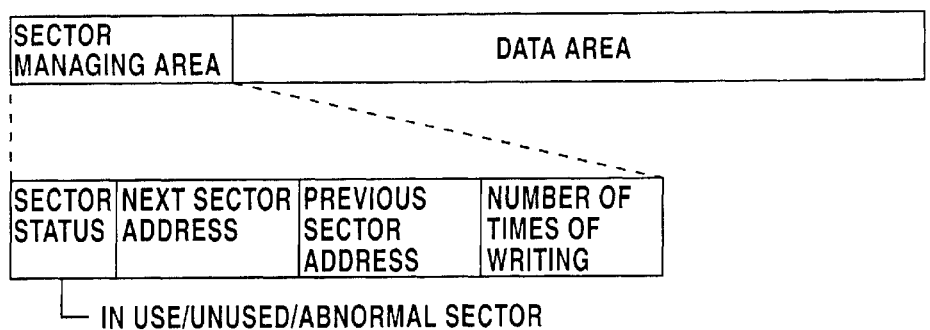
FIG. 21 is a drawing showing the structure of each sector inside the main area of the non-volatile memory according to a third embodiment of the present invention.
FIG. 22 is a table showing examples of information written in sectors in use.

FIG. 21 is a drawing showing the structure of each sector of a main area 27c inside a non-volatile memory 27 of an IC card 2 according to the third embodiment. As shown in FIG. 21, each sector in the main area 27c comprises a sector managing area managing the status of the sector and a data area. The sector managing area further comprises "sector status (a status displaying area)" showing the status of the sector (whether the sector is in use, not use or an abnormal sector), "next sector address (a second pointer displaying area)" showing the address of the next sector inside the same file, "previous sector address (a first pointer displaying area)" showing the address of the pervious sector inside the same file and "number of times of writing (a number of times of writing displaying area)" showing the total number of times of writing to the sector. FIG. 22 is a table showing an example of the contents of each sector managing area and data area for sectors in use ranging in the order of the sector addresses n−1, n, n+1, n+2. Further, FIG. 23 is a table showing the contents of each sector managing area and data area for unused sectors with sector addresses m through m+3 (either of the areas is unwritten).

Other hardware compositions in the third embodiment is absolutely the same as those of the first embodiment, description thereof is omitted.

Since programs stored in a ROM 25 and executed by a CPU 21 in the third embodiment are identically the same as those of the first embodiment, except that the writing processing in a non-volatile memory executed by a non-volatile memory manager 34 is different, description thereof is omitted.

Figure 24:
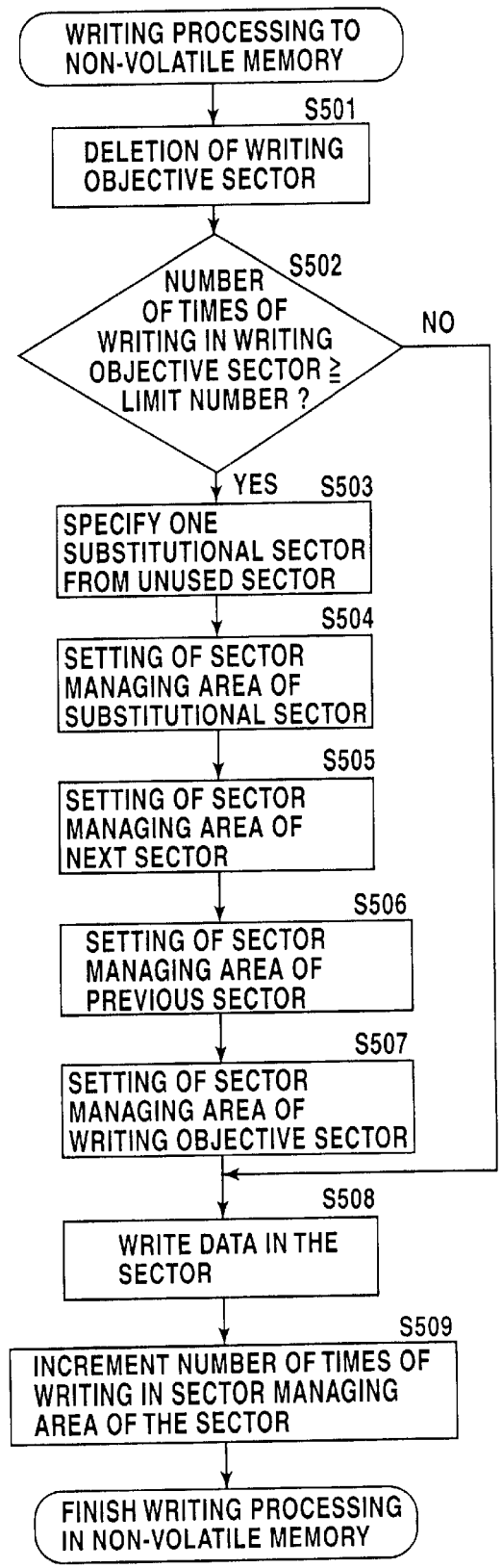
FIG. 24 is a flow chart showing the details of the writing processing to the non-volatile memory executed at S010 and S012 of FIG. 12 and at S304 and S306 of FIG. 16.

Details of the writing processing in the non-volatile memory (a writing routine 35a) executed by the non-volatile memory manager 34, respectively, in steps S010 and S012 of FIG. 12 and in steps S304 and S306 of FIG. 16 in the third embodiment will be hereinafter described based on FIG. 24.

At step S501 which is the first step after entering the writing processing, the non-volatile memory manager 34 sets the address of the writing objective sector in the sector address register of the non-volatile memory control circuit 26 and sets a deletion instruction in the control register of a non-volatile memory control circuit 26. When the deletion instruction is set, the non-volatile memory control circuit 26 executes the data deletion of the sector corresponding to the address set in the sector address register.

At the next step S502, the non-volatile memory manager 34 reads out the number of times of writing out the sector managing area of the writing objective sector and checks if the read out number of times of writing reaches the predetermined limit number (e.g., 100,000 times). Then, if the read-out number of times of writing does not reach the limit number yet, the non-volatile memory manager 34 advances the processing to step S508. On the contrary, if the read-out number of times of writing reaches the limit number, the non-volatile memory manager 34 judges that the writing objective sector becomes unavailable (equivalent to a judging element) and requests the substitutional sector processing program 35c (a substitutional sector layout element) of the non-volatile memory access 35 of the substitutional sector layout. The requested substitutional sector processing program 35c advances the processing to step S503.

At step S503, the substitutional sector processing program 35c specifies (cuts out) one of the sectors whose "sector status" of the sector managing area is "unused" as the substitutional sector.

At the next step S504, the substitutional sector processing program 35c changes the "sector status" of the sector managing area of the substitutional sector specified in step S503 to "in use", and copies the contents in the sector managing area of the original writing objective sector to the "next sector address" and the "previous sector address" of that specified in step S503 and initializes the "number of times of writing " of that specified in step S503.

At the next step S505, the substitutional sector processing program 35c specifies the next sector shown by the "next sector address" of the sector managing area of the original writing objective sector and writes the sector address of the substitutional sector specified at step S503 in the "previous sector address" of the sector managing area of the specified sector.

At the next step S506, the substitutional sector processing program 35c specifies the previous sector shown by the "previous sector address" of the sector managing area of the original writing objective sector and writes the sector address of the substitutional sector specified at step S503 in the "next sector address" of the sector managing area of the specified sector.

At the next step S507, the substitutional sector processing program 35c changes the "sector status" of the sector managing area of the original writing objective sector to "abnormal sector". After completing step S507, the substitutional sector processing program 35c notifies the non-volatile memory manager 34 that the substitutional sector layout is completed. The notified non-volatile memory manager 34 advances the processing to step S508.

At step S508, the non-volatile memory manager 34 executes data writing into the sector which is the original writing objective sector in case the number of times of writing of the original writing objective sector does not reach the limit number of times of writing, or alternatively, which is the substitutional sector specified at step S503 in case the number of times of writing of the original writing objective sector reaches the limit number. This means that the non-volatile memory manager 34 sets the sector address of the sector in the sector address register of the non-volatile memory control circuit 26, sets the writing objective data in the writing register of the non-volatile memory control circuit 26 and sets the writing instruction in the control register of the non-volatile memory control circuit 26. When the writing instruction is set, the non-volatile memory control circuit 26 writes the data written into the writing register in the sector address set in the sector address register.

At the next step S509, the non-volatile memory manager 34 increments the "number of times of writing" in the sector managing area of the sector in which data is written in step S507. After this, the non-volatile memory manager 34 finishes the writing processing in the non-volatile memory and notifies the recovery program 31 of the completion of the processing.

Layout of the substitutional sector according to this embodiment will be described next based on FIG. 22 and FIG. 23.

We now assume that, when we check the "number of times of writing" in order to write data into the sector of the sector address n, the number of times of writing reaches the limit number y and an unused sector of the sector address m is specified as the substitutional sector.

In this case, the non-volatile memory manager 34 makes the "sector status" in the sector managing area in the substitutional sector of the sector address m as "in use", writes "n+1" in the "next sector address" in the sector managing area of address m, writes "n−1" in the "previous sector address" in the sector managing area of address m and writes "0" in the "number of times of writing" in the sector managing area of address m (step S504).

Next, the non-volatile memory manager 34 rewrites the "previous sector address" in the sector managing area in the sector with the sector address n+1 as "m")step S505) and rewrites the "next sector address" in the sector managing area in the sector with the sector address n−1 as "m" (step S506).

In addition, the non-volatile memory manager 34 rewrites the "sector status" in the sector managing area in the sector with the sector address n as "abnormal sector" (step S507).

After this, the writing objective data is written in the data area of the substitutional sector of the sector address m.

According to the card-type storage medium of the present invention as described above, the destruction itself of a file in case power failures, errors, etc., occur while data is written in the file inside the storage medium can be prevented and the increase of data volume retained by the storage medium can be prevented. Further, improvement of a response to a higher-class unit becomes possible.

Thus, it is seen that a card-type storage medium is provided. One skilled in the art will appreciate that the present invention can be practiced by other than the embodiments which are presented for purpose of illustration, and not of limitation, and the present invention is limited only by the claims which follow.

What is claimed is:

1. A card-type storage medium connected detachably to a higher-class unit inputting data into the medium, comprising:

a first non-volatile storage area located inside the card-type storage medium which stores data;

a second non-volatile storage area smaller than said first non-volatile storage area, located inside the card-type storage medium which temporarily stores a part of the whole amount of the data to be kept in said first non-volatile storage area, the data input by said higher-class unit; and a writing element which writes the data stored in said second non-volatile storage area into said first non-volatile storage area when an operation of storing data into said second non-volatile storage area performed by said higher-class unit is completed, wherein the data to be written into the first non-volatile storage area is first stored in the second non-volatile storage area and then upon completion of writing, the same data is subsequently written into the first non-volatile storage area.

2. The card-type storage medium according to claim 1, wherein said writing element writes the data stored in said second non-volatile storage area into said first non-volatile storage area when said writing element is powered-up.

3. The card-type storage medium according to claim 1, further comprising:

data receiving element receiving data from said higher-class unit and storing the data into said second non-volatile storage area; and a data storing completion notifying element which notifies the completion of the operation of storing data to said higher-class unit at the time when the data input by said higher-class unit is completely stored into said second non-volatile storage area but before the data is written into said first non-volatile storage area, wherein said writing element writes the data stored in said second non-volatile storage area into said first non-volatile storage area without relation to said higher-class unit after the completion of the operation of storing data is notified to said higher-class unit by the data storing completion notifying element.

4. The card-type storage medium according to claim 1, wherein said first non-volatile storage area and said second non-volatile storage area are constructed on the same non-volatile memories.

5. The card-type storage medium according to claim 1, wherein said first non-volatile storage area and said second non-volatile storage area are divided into multiple sectors, respectively, and wherein said writing element writes, for each sector of said second non-volatile storage area, the data stored in said each sector into a sector, corresponding to a writing area specified by said higher class unit, of said first non-volatile storage area.

6. The card-type storage medium according to claim 5, further comprising an identifying element which identifies for each sector of said second non-volatile storage area, whether or not writing of data stored in the sector into said first non-volatile storage area is completed; and said writing element writes, only for the sector of said second non-volatile storage area for which said identifying element identifies that writing of the data stored therein into said first non-volatile storage area is not completed, the data stored therein into a sector, corresponding to a writing area specified by said higher class unit, of said first non-volatile storage area.

7. The card-type storage medium according to claim 1, wherein the data stored in said first non-volatile storage area comprises a plurality of files which predetermined files are kept in duplicated form.

8. The card-type storage medium according to claim 5, further comprising:

a determining element which determines whether or not a defect is detected in a certain sector to be written by said writing element; and a substitutional sector layout element which specifies any unused sector inside said first non-volatile storage area as a substitutional sector and causes said writing element to write said data into said substitutional sector when said defect is detected by said determining element in said certain sector.

9. The card-type storage medium according to claim 8, further comprising an unused sector managing element which manages unused sectors inside said first non-volatile storage area, wherein said substitutional sector layout element specifies one of the unused sectors managed by said unused sector managing element as said substitutional sector.

10. The card-type storage medium according to claim 8, wherein a sector existing in the specific position inside said first non-volatile storage area is preserved in advance as a substitutional sector, and wherein said substitutional sector layout element specifies one of the sectors preserved for said substitutional sector as said substitutional sector.

11. The card-type storage medium according to claim 8, wherein said substitutional sector layout element includes a correspondence table showing the corresponding relation of said substitutional sector to the unavailable sector into which said determining element determines that writing of said data is impossible.

12. The card-type storage medium according to claim 9, wherein said unused sector managing element includes a status displaying area prepared for each sector inside said first non-volatile storage area and indicates whether the corresponding sector is in a state of being one of in use, not in use, or unavailable.

13. The card-type storage medium according to claim 12, further comprising, for each sector of said first non-volatile storage area:

a first pointer displaying area for showing a pointer of a sector immediately before the object sector, and a second pointer displaying area for showing a pointer of a sector right after the object sector, wherein said substitutional sector layout element, when specifying a substitutional sector for an unavailable sector, changes an indication of said status displaying area for the unavailable sector to being unavailable, displays the pointer of the substitutional sector in the second pointer displaying area of the sector whose pointer is shown by the first pointer displaying area of the unavailable sector, and displays the pointer of the substitutional sector in the first pointer displaying area of the sector whose pointer is shown by the second pointer displaying area of the unavailable sector.

14. The card-type storage medium according to claim 8, further comprising, for each sector of said first non-volatile storage area:

an area for displaying the total number of times of retrying to write data in said each sector, wherein said determining element determines the sector whose total number of times of retrying to write data displayed in said area for displaying the number of times of retrying to write data is equal to or greater than the predetermined number of times or more as an unavailable sector.

15. The card-type storage medium according to claim 8, wherein said writing element executes, prior to a data writing processing in a certain sector, a deletion processing operation to the certain sector, and wherein said determining element determines, if the time required until the completion of a data deletion in a certain sector reaches the predetermined time, that the certain sector is unavailable.

16. The card-type storage medium according to claim 8, wherein said writing element executes, prior to a data writing processing to a certain sector, a deletion and retrying deletion processing operation to the certain sector, and wherein said determining element determines, if the number of times of retrying deletion by said writing element required until the completion of data deletion in a certain sector is equal to or greater than the predetermined number of times, that the certain sector is unavailable.

17. The card-type storage medium according to claim 8, wherein said determining element determines, if the number of times of retrying to write data by said writing element required until the completion of data writing in a certain sector is equal to or greater than the predetermined number of times, that the certain sector is unavailable.

* * * * *